United States Patent
Kojima

(10) Patent No.: US 6,851,404 B2
(45) Date of Patent: Feb. 8, 2005

(54) DEVICE FOR STARTING ENGINE

(75) Inventor: Susumu Kojima, Susono (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/825,435

(22) Filed: Apr. 16, 2004

(65) Prior Publication Data

US 2004/0226530 A1 Nov. 18, 2004

(30) Foreign Application Priority Data

May 13, 2003 (JP) ........................................ 2003-134647

(51) Int. Cl.$^7$ ........................... F02N 17/00; F02M 25/07
(52) U.S. Cl. ................................. 123/179.1; 123/179.5; 123/519; 123/568.14
(58) Field of Search ........................... 123/179.1, 179.5, 123/518, 519, 568.14

(56) References Cited

U.S. PATENT DOCUMENTS

| | | | |
|---|---|---|---|
| 3,763,839 A | * 10/1973 | Alquist | ........................ 123/519 |
| 4,075,990 A | * 2/1978 | Ribeton | .................. 123/568.14 |
| 6,588,397 B1 | * 7/2003 | Sieber | ......................... 123/295 |
| 6,799,547 B2 | * 10/2004 | Sieber | ...................... 123/179.5 |

FOREIGN PATENT DOCUMENTS

| JP | A 7-71350 | 3/1995 |
|---|---|---|
| JP | A 2000-303938 | 10/2000 |

* cited by examiner

Primary Examiner—Henry C. Yuen
Assistant Examiner—Arnold Castro
(74) Attorney, Agent, or Firm—Oliff & Berridge, PLC

(57) ABSTRACT

In order to start an engine, a crankshaft is first rotated reversely by a target amount of the reverse rotation and then rotated forwardly. When the crankshaft is rotated reversely, the residual gas is sucked from the exhaust passage into the combustion chamber, and residual gas is discharged from the combustion chamber into the intake passage. Next, when the crankshaft is rotated forwardly, the residual gas is sucked from the intake passage into the combustion chamber together with air, and burnt in the combustion chamber. The target amount of the reverse rotation is set to generate the backward gas flow from the combustion chamber to the intake passage in all cylinders, or to generate the backward gas flow from the exhaust passage through the combustion chamber to the intake passage in at least one cylinder.

30 Claims, 20 Drawing Sheets

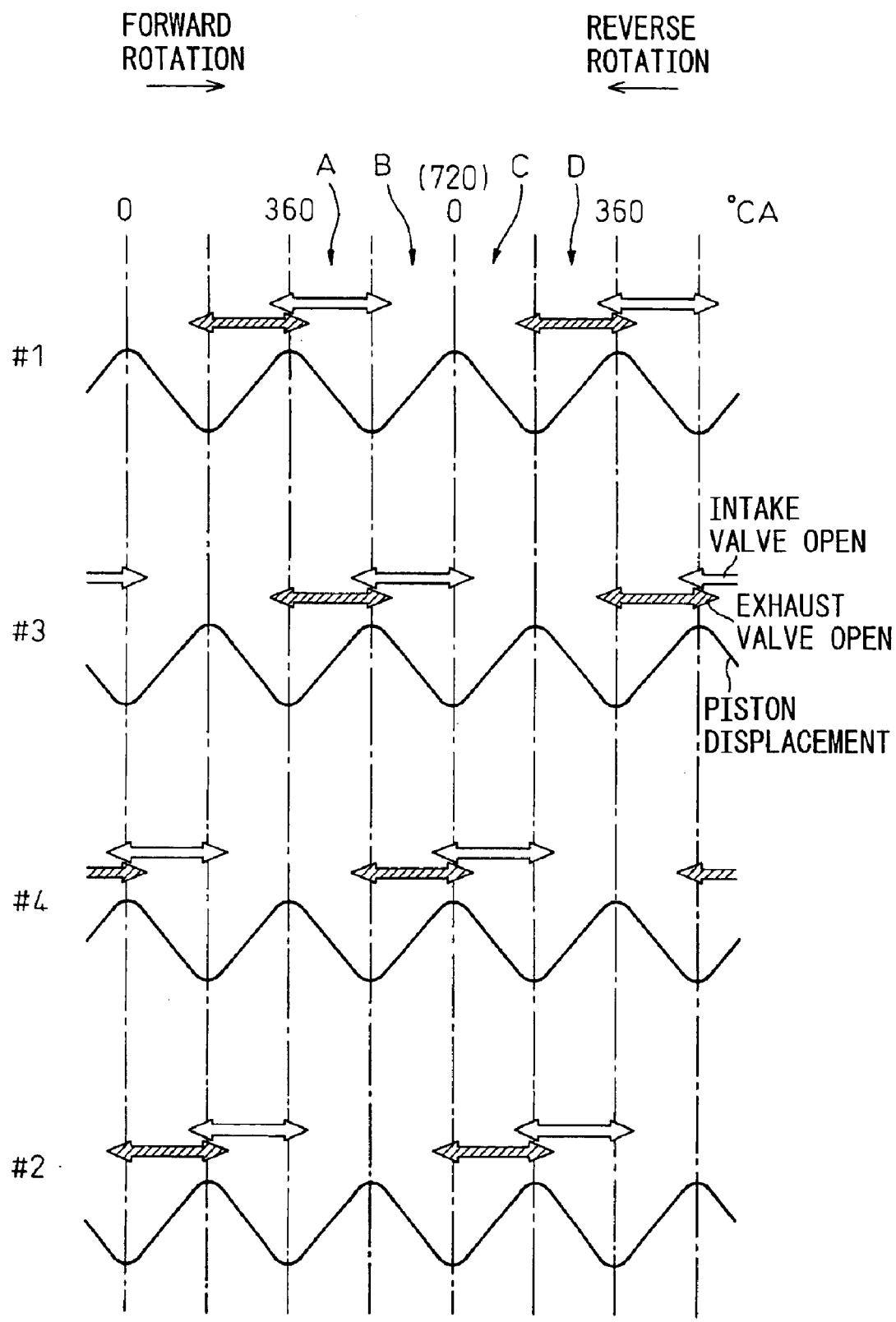

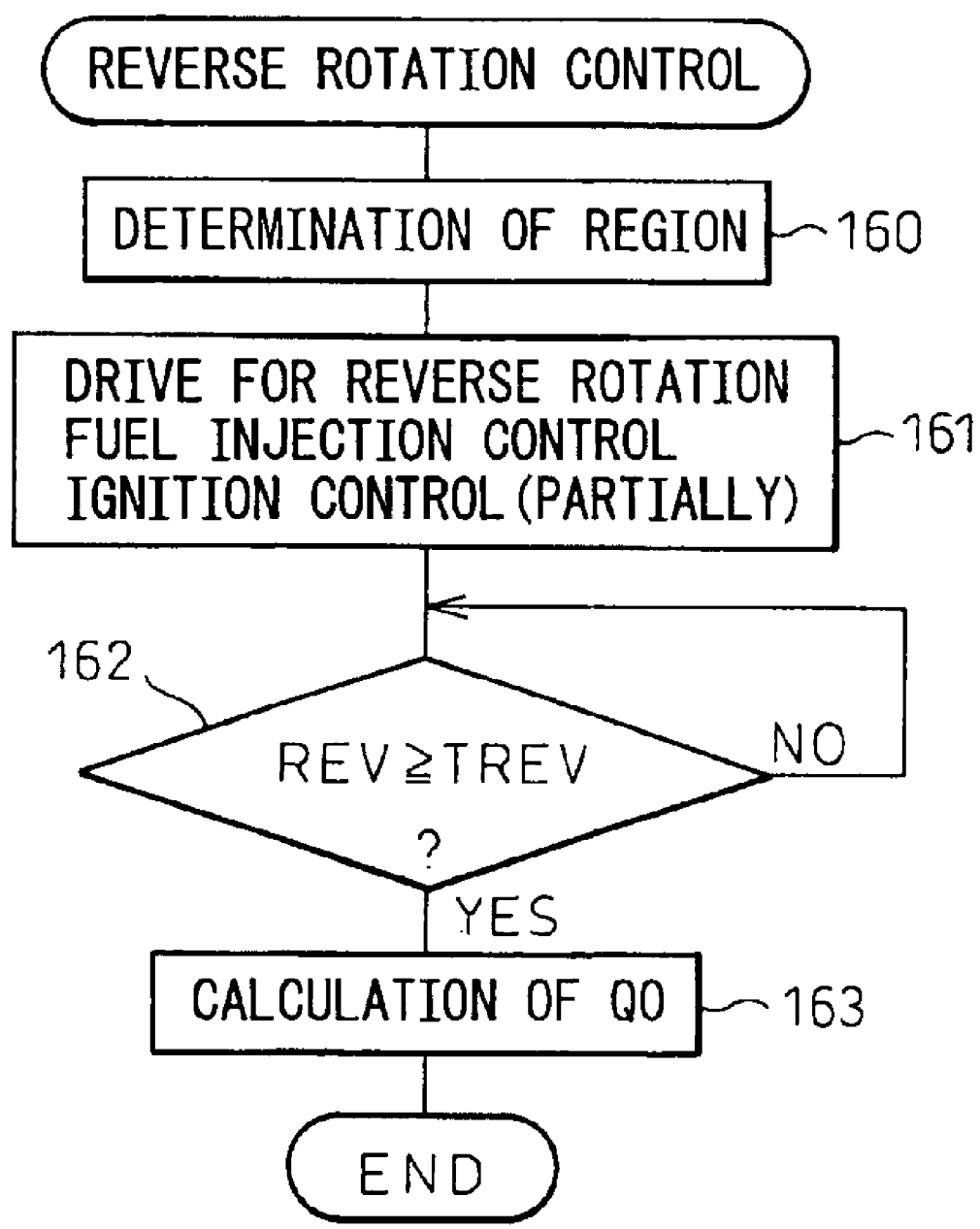

DEVICE FOR STARTING ENGINE

BACKGROUND OF THE INVENTION

1. Field of the Invention

The present invention relates to a device for starting an engine.

2. Related Art

In a known internal combustion engine, in order to start the engine, a crankshaft is first rotated reversely and is then rotated forwardly by a starter motor (see Japanese Unexamined Patent Publications No. 2000-303938 and 7-71350). Specifically, in the engine mentioned above, when the engine must be started, the cranking in the reverse direction is first conducted and the cranking in the forward direction is then conducted. This reduces an amount of torque required to start the engine.

When the cranking is conducted in either the forward or reverse direction, a gas flow is generated in the intake passage, the combustion chamber and the exhaust passage. However, during the stoppage of the engine, a residual gas containing unburned HC (hydrocarbon) may exist in the combustion chamber and the exhaust passage upstream of the catalyst, and unburned HC may be adhered to the walls of the intake passage, the combustion chamber and the exhaust passage upstream of the catalyst. Therefore, when the cranking is conducted, the residual gas containing unburned HC may be discharged outside the engine. Although a catalyst is typically arranged in the exhaust passage, the catalyst is not always activated at the engine start. None of the above documents indicates the above-mentioned problem.

SUMMARY OF THE INVENTION

An object of the present invention is to provide a device, for starting an engine, capable of preventing a residual gas from being discharged outside the engine.

According to one aspect of the present invention, there is provided a device for starting an engine, the engine including a crankshaft, an intake passage, an exhaust passage, and a plurality of cylinders having respective combustion chambers, pistons, intake valves, and exhaust valves, the device comprising: means for setting a target amount of the reverse rotation of the crankshaft; and means for rotating the crankshaft first reversely by the target amount of the reverse rotation and then rotating forwardly, to start the engine, wherein, when the crankshaft is rotated reversely, the piston displaces upwardly while the intake valve is opened within a crank angle range corresponding to the intake stroke during the forward rotation of the crankshaft, to thereby generate a backward gas flow from the combustion chamber to the intake passage, and wherein the target amount of the reverse rotation is set to generate a backward gas flow from the combustion chamber to the intake passage in all cylinders.

According to another aspect of the present invention, there is provided a device for starting an engine, the engine including a crankshaft, an intake passage, an exhaust passage, and at least one cylinder having a combustion chamber, a piston, an intake valve, and an exhaust valve, the device comprising: means for setting a target amount of the reverse rotation of the crankshaft; and means for rotating the crankshaft first reversely by the target amount of the reverse rotation and then rotating forwardly, to start the engine, wherein, when the crankshaft is rotated reversely, the piston displaces downwardly while the exhaust valve is opened within a crank angle range corresponding to the exhaust stroke during the forward rotation of the crankshaft, to thereby generate a backward gas flow from the exhaust passage into the combustion chamber, and the piston displaces upwardly while the intake valve is opened within a crank angle range corresponding to the intake stroke during the forward rotation of the crankshaft, to thereby generate a backward gas flow from the combustion chamber to the intake passage, and wherein the target amount of the reverse rotation is set to generate a backward gas flow from the exhaust passage through the combustion chamber to the intake passage in at least one cylinder.

Note that, as long as a specific remark is not made, the terms "upstream" and "downstream" refer to a gas flow generated when the crankshaft is rotated forwardly.

The present invention may be more fully understood from the description of the preferred embodiments according to the invention as set forth below, together with the accompanying drawings.

BRIEF DESCRIPTION OF THE DRAWINGS

In the drawings:

FIG. 4 is a diagram showing a displacement of a piston and opening periods of intake valves and exhaust valves, with respect to a change of the crank angle;

FIG. 24 is a flowchart showing a reverse rotation control routine according to the sixth embodiment of the present invention.

DESCRIPTION OF THE PREFERRED EMBODIMENTS

Figure 1:
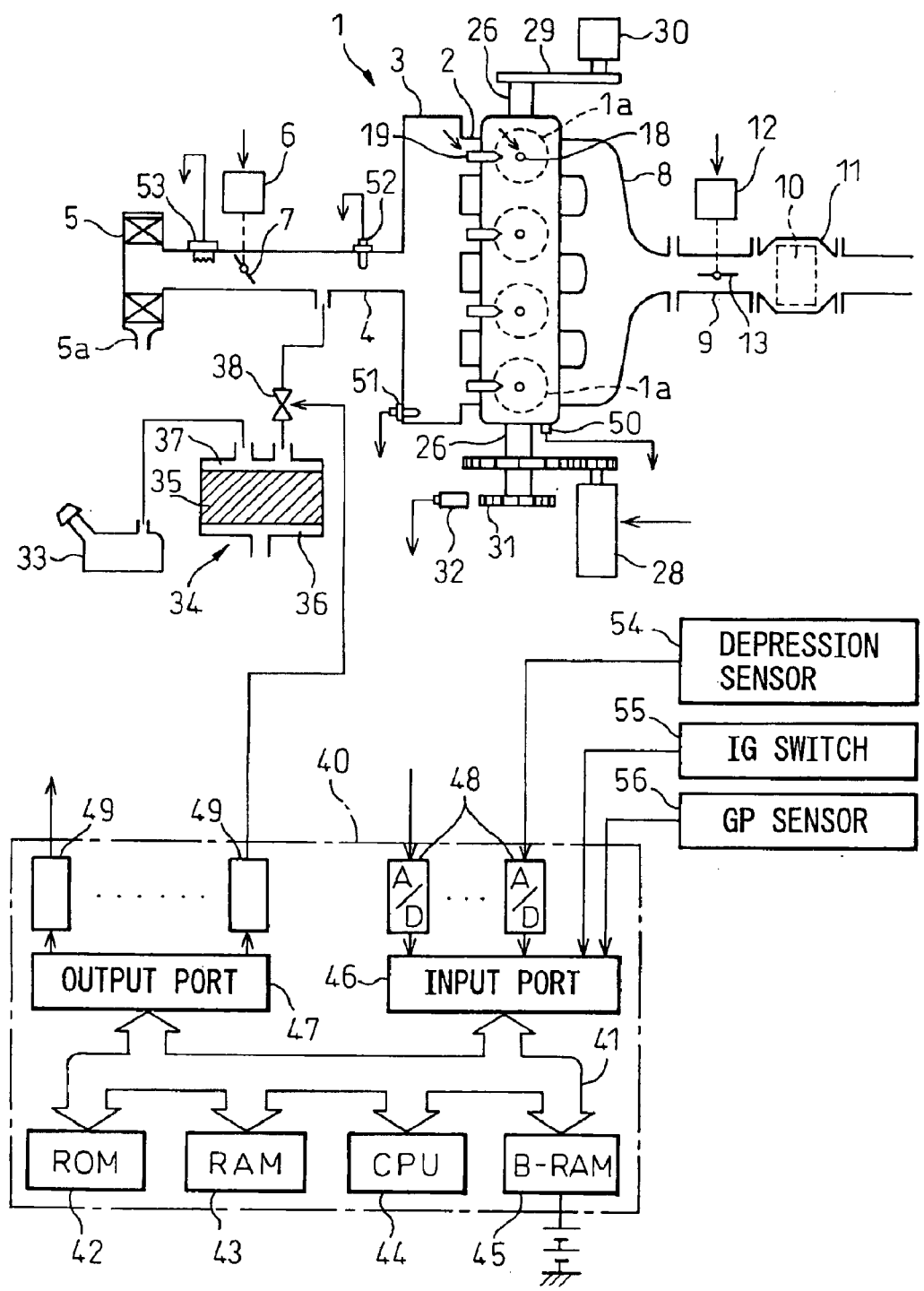
FIG. 1 is an overall view of an internal combustion engine.

FIG. 1 shows a case in which the present invention is applied to an internal combustion engine of a four-cylinder, four-stroke, spark-ignition, and direct injection type. Alternatively, the present invention can also be applied to an engine having one or more cylinders except for four cylinders, a two-stroke engine, a port-injection type engine in which fuel is injected into an intake passage, or a compression-ignition type engine.

Referring to FIG. 1, each cylinder 1a of an engine body 1 is connected to a surge tank 3 via a corresponding intake branch pipe 2, and the surge tank 3 is connected to an air cleaner 5 via an intake duct 4. In the intake duct 4, a throttle valve 7 driven by a step motor 6 is arranged. The intake branch pipes 2, the surge tank 3, the intake duct 4 and the air cleaner 5 compose an intake passage. Each cylinder 1a is also connected to a casing 11 housing a catalyst 10 therein, via an exhaust manifold 8 and an exhaust pipe 9, and the casing 11 is connected to an exhaust pipe 9a. The exhaust manifold 8, the exhaust pipes 9, 9a and the casing 11 compose an exhaust passage. In the exhaust pipe 9, an exhaust throttle valve 13 driven by an actuator 12 of, for example, negative pressure type, is arranged. The exhaust throttle valve 13 is fully opened in the normal engine operation. The exhaust throttle valve 13 may be arranged in the exhaust pipe downstream of the catalyst 10. Note that, in the engine shown in FIG. 1, combustion is conducted in order of #1-#3-#4-#2.

Figure 2:
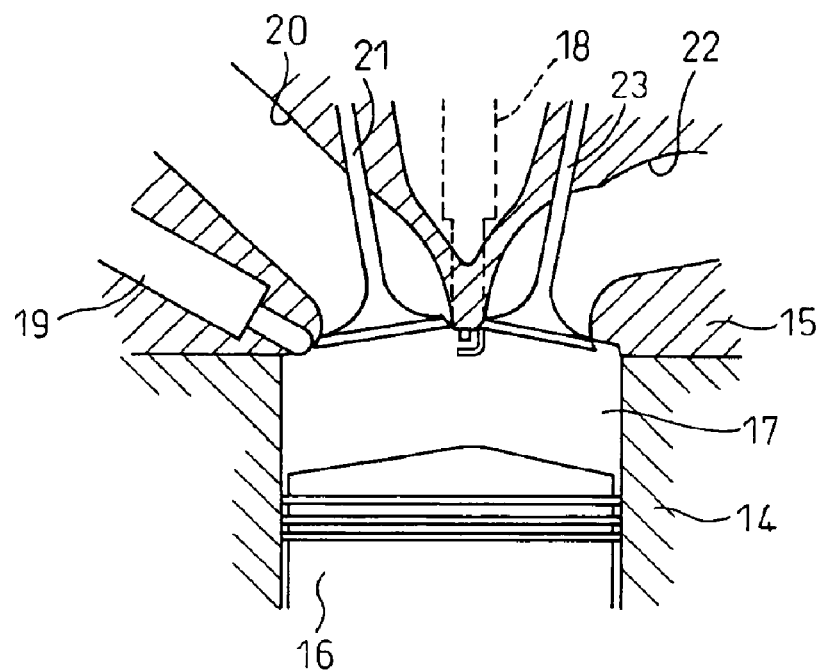
FIG. 2 is an enlarged sectional view of a cylinder.

Referring to FIG. 2 showing each cylinder 1a, the reference numeral 14 designates a cylinder block, 15 designates a cylinder head, 16 designates a piston, 17 designates a combustion chamber, 18 designates a spark plug, 19 designates a fuel injector arranged in the combustion chamber 17, 20 designates a pair of intake ports, 21 designates a pair of intake valves, 22 designates a pair of exhaust ports and 23 designates a pair of exhaust valves.

Figure 3:
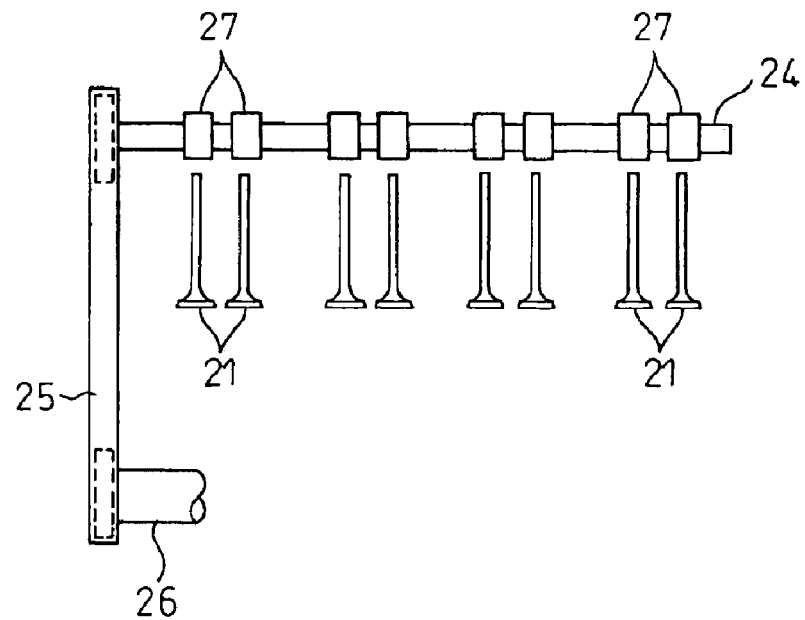
FIG. 3 is a schematic illustration showing intake valves and a cam shaft.

The intake valves 21 and the exhaust valves 23 of each cylinder 1a are respectively driven by corresponding cams formed on corresponding cam shafts. In the embodiments according to the present invention, a cam shaft 24 for driving the intake valves 21 is always connected to a crankshaft 26 via a chain 25, as shown in FIG. 3. A cam shaft (not shown) for driving the exhaust valves 23 is always connected to the cam shaft 24 for driving the intake valves 21 via a gear device (not shown). Accordingly, when the crankshaft 26 is rotated, the pair of the cam shafts are rotated together to drive the intake valves 21 and the exhaust valve 23 to be opened or closed. Note that the reference numeral 27 in FIG. 3 designates cams formed on the cam shaft 24.

Referring again to FIG. 1, the crankshaft 26 of the engine 1 is connected to an electric motor or a starter motor 28 for forcibly rotating the crankshaft 26, via, for example, an electromagnetic clutch. The rotational speed of the starter motor 28 is adjustable. The starter motor 28 can drive in the forward and reverse directions. On the other hand, the crankshaft 26 and the cam shafts can also rotate in the forward and reverse directions. Note that the crankshaft 26 may drive the starter motor 28 to generate the electric power when the engine is operated. Further, as shown in FIG. 1, the crankshaft 26 is connected to an auxiliary device such as an oil pump 30 via, for example, a belt 29.

A rotor 31 is fixed to the crankshaft 26, and protrusions of thirty four teeth, with two teeth lacking, are formed on the rotor 31 at 100 interval, for example. A crank angle sensor 32 composed of an electromagnetic pickup is arranged facing these protrusions. The crank angle sensor 32 generates output pulses whenever the protrusion of the rotor 31 passes by the crank angle sensor 32. The tooth lacking portion of the rotor 31 is arranged so that the No. 1 cylinder #1, for example, is located at the top dead center of compression when the tooth lacking portion faces the crank angle sensor 32. Accordingly, when a signal expressing the tooth lacking portion is detected, it is be determined that the crank angle is 0° CA. Therefore, the crank angle can be found according to the output pulses sequentially generated. In addition, the engine speed is obtained according to the period of time from when the signal expressing the tooth lacking portion is output to when the signal is output next time, i.e., the period of time elapsed for one rotation of the crankshaft 26.

In the engine 1 shown in FIG. 1, there is provided a canister 34 for temporarily storing therein fuel vapor (hydrocarbon) generated in a fuel tank 33. The canister 34 includes: an adsorbing layer 35 composed of activated carbon, for example; an air chamber 36 provided on one side of the adsorbing layer 35; and a vapor chamber 37 provided on the other side of the adsorbing layer 35. The air chamber 36 is communicated with the atmospheric air. The vapor chamber 37 is connected to an upper space of the fuel tank 33 and to the intake duct 4 downstream of the throttle valve 7 via a purge control valve 38 of an electromagnetic type.

During the stoppage of the engine, the purge control valve 38 is closed. At this time, fuel vapor generated in the fuel tank 33 reaches the adsorbing layer 35 via the vapor chamber 37 and is adsorbed in the adsorbing layer 35. When the purge control valve 38 is opened during the engine operation, the atmospheric air flows from the air chamber 36 through the adsorbing layer 35 into the vapor chamber 37, during which fuel vapor is desorbed from the adsorbing layer 35. This fuel vapor together with the air is purged into the intake duct 4 via the purge control valve 38.

Further, in the engine shown in FIG. 1, the volume of the intake passage which lies between the air inlet 5a of the air cleaner 5 and the intake valve 21 is made to be substantially equal to or larger than the total volume of the exhaust passage and the combustion chamber which lie between the intake valve 21 and the catalyst 10. Alternatively, the volume of the intake passage which lies between the air inlet 5a and the intake valve 21 may be made to be substantially equal to or larger than that of the exhaust passage which lies between the exhaust valve 23 and the catalyst 10.

An electronic control unit (ECU) 40 is comprised of a digital computer including a ROM (read-only memory) 42, a RAM (random access memory) 43, a CPU (microprocessor) 44, a B-RAM (backup RAM) 45 always connected to the power supply, an input port 46 and an output port 47, which are connected to each other by a bidirectional bus 41. A water temperature sensor 50 is attached to the engine body 1 for detecting the temperature of the engine cooling water, and a pressure sensor 51 is attached to the surge tank 3 for detecting pressure in the surge tank 3. A HC concentration sensor 52 is attached to the intake duct 4 downstream of the throttle valve 7, for detecting the concentration of HC in the intake duct 4. An air flow meter 53 is attached to the intake duct 4 upstream of the throttle valve 7 for detecting an amount of the intake air. A depression sensor 54 is attached to an accelerator pedal (not shown) for detecting a depression of the accelerator pedal. Output signals of these sensors 50, 51, 52, 53, and 54 are input into the input port 46 via respective AD converters 48. Further, the input port 46 is connected to the crank angle sensor 32 mentioned above, an ignition switch (IG) 55 which generates output pulses expressing that it is turned on, and a gear position (GP) sensor 56 which generates output pulses representing the gear position of the transmission (not shown). On the other hand, the output port 47 is connected to the step motor 6, the actuator 12, the ignition plug 18, the fuel injector 19, the starter motor 28 and the purge control valve 38 via respective drive circuits 49.

FIG. 4 shows a displacement of the piston 16 (solid line), valve opening periods of the intake valves 21 (white arrow) and of the exhaust valves 23 (hatched arrow), with respect to a change of the crank angle. In FIG. 4, the top dead center of compression of the No. 1 cylinder #1 is defined as 0° crank angle (CA), and the crank angle is shown as when the crankshaft 26 is rotated forwardly.

Figure 5A:
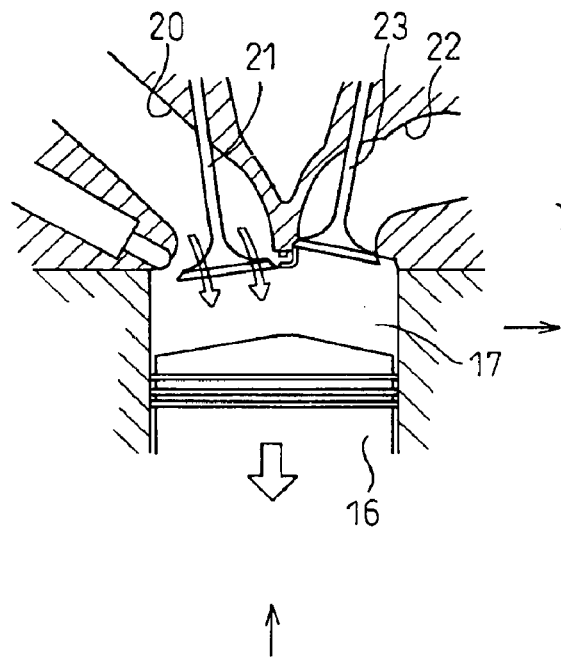
FIGS. 5A–5D are schematic illustrations for explaining an operation of the engine when a crankshaft is rotated forwardly.
Figure 5B:
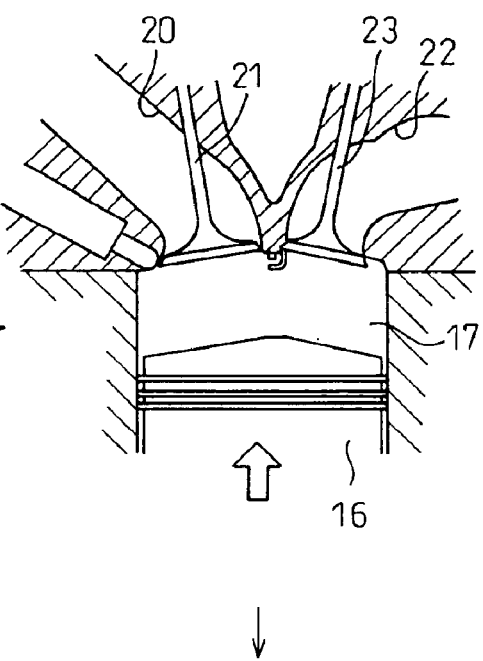
Figure 5D:
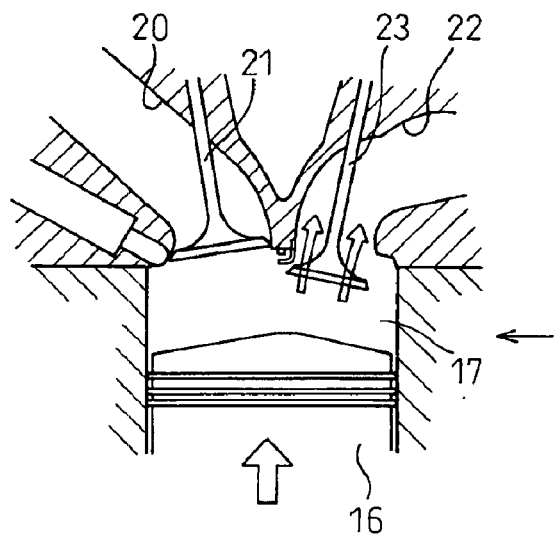
Figure 5C:
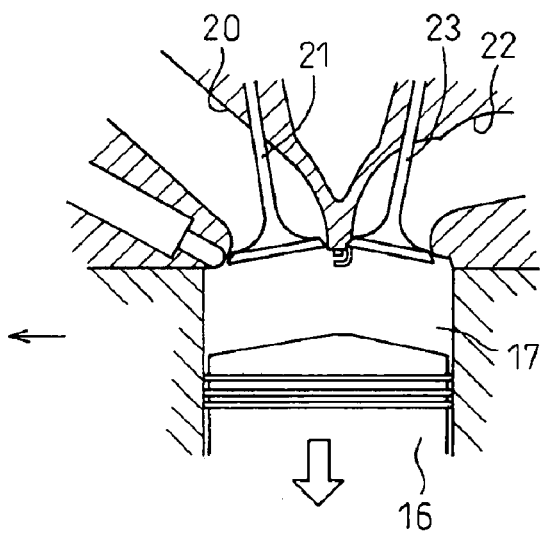

Regarding No. 1 cylinder #1, when the crankshaft 26 is rotated forwardly, within the crank angle range represented by A in FIG. 4, i.e., the intake stroke, the piston 16 is displaced downwardly while the exhaust valve 23 is closed and the intake valve 21 is opened as shown in FIG. 5A and, thereby, a gas is sucked from the intake port 20 into the combustion chamber 17. In the following crank angle range represented by B shown in FIG. 4, i.e., the compression stroke, the piston 16 is displaced upwardly while the intake valve 21 and the exhaust valve 23 are closed as shown in FIG. 5B and, thereby, the compression is conducted. In the following crank angle range represented by C in FIG. 4, i.e., the expansion stroke, the piston 16 is displaced downwardly while the intake valve 21 and the exhaust valve 23 are closed as shown in FIG. 5C and, thereby, the expansion is conducted. In the following crank angle range represented by D in FIG. 4, i.e., the exhaust stroke, the piston 16 is displaced upwardly while the intake valve 21 is closed and the exhaust valve 23 is opened as shown in FIG. 5D and, thereby, the gas is discharged from the combustion chamber 17 into the exhaust port 22. These processes are carried out sequentially and repeatedly.

Figure 6A:
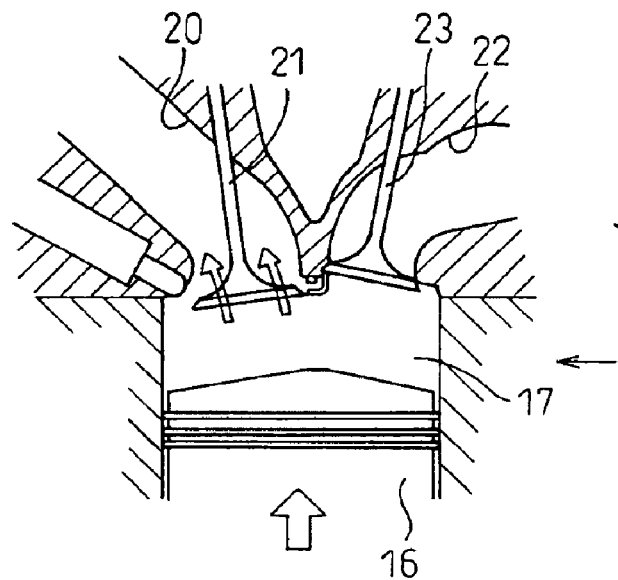
FIGS. 6A–6D are schematic illustrations for explaining an operation of the engine when a crankshaft is rotated reversely.
Figure 6B:
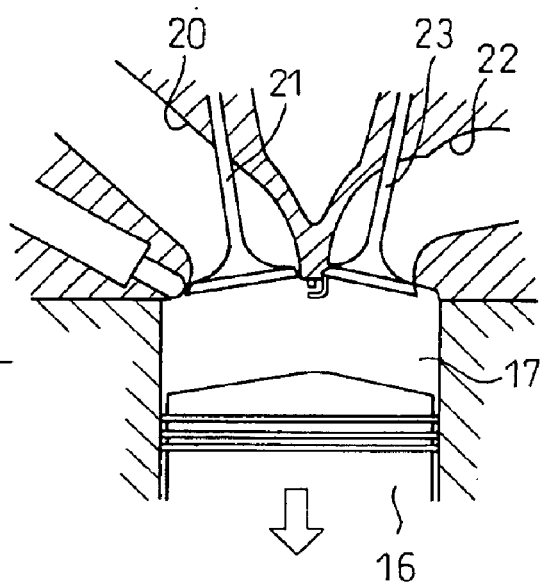
Figure 6D:
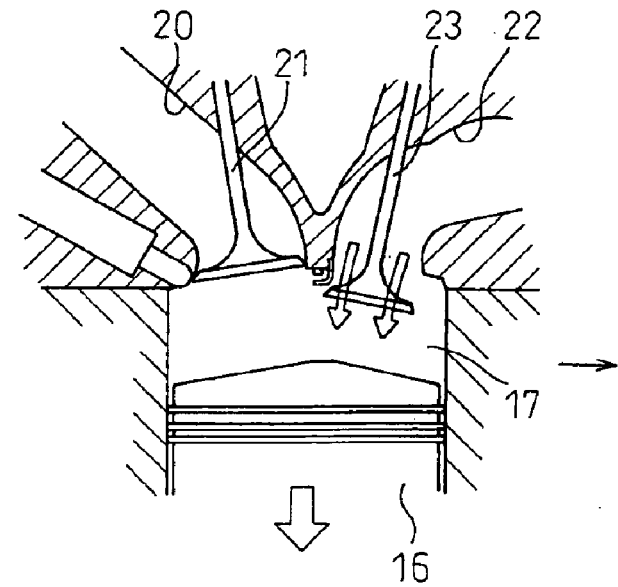
Figure 6C:
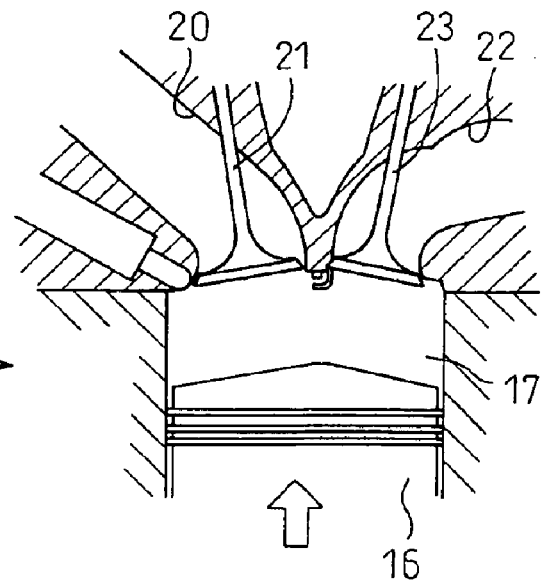

In contrast, when the crankshaft 26 is rotated reversely, the engine operation is conducted as follows. Paying attention to the No. 1 cylinder #1 again, in the crank angle range shown by D in FIG. 4, which corresponds to the exhaust stroke during the forward rotation of the crankshaft 26, the piston 16 is displaced downwardly while the intake valve 21 is closed and the exhaust valve 23 is opened as shown in FIG. 6D and, thereby, a gas is sucked from the exhaust port 22 into the combustion chamber 17. In the following crank angle range shown by C in FIG. 4, which corresponds to the expansion stroke during the forward rotation of the crankshaft 26, the piston 16 is displaced upwardly while the intake valve 21 and the exhaust valve 23 are closed as shown in FIG. 6C and, thereby, the compression is conducted. In the following crank angle range shown by B in FIG. 4, which corresponds to the compression stroke during the forward rotation of the crankshaft 26, the piston 16 is displaced downwardly while the intake valve 21 and the exhaust valve 23 are closed as shown in FIG. 6B and, thereby, the expansion is conducted. In the following crank angle range shown by A in FIG. 4, which corresponds to the intake stroke during the forward rotation of the crankshaft 26, the piston 16 is displaced upwardly while the exhaust valve 23 is closed and the intake valve 21 is opened as shown in FIG. 6A and, thereby, the gas is discharged from the combustion chamber 17 into the intake port 20. These processes are carried out sequentially and repeatedly.

In this way, a reverse rotation of the crankshaft 26 will transfer the gas in the exhaust passage to the combustion chamber 17, and the gas in the combustion chamber 17 to the intake passage.

Figure 7:
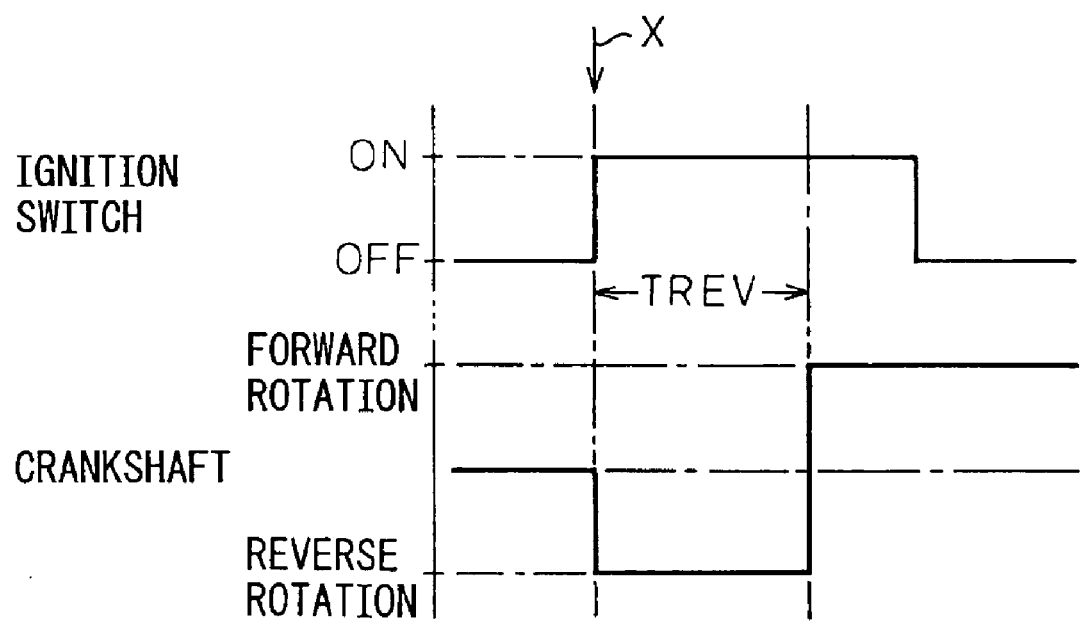
FIG. 7 is a diagram for explaining the first embodiment according to the present invention.
Figure 8A:
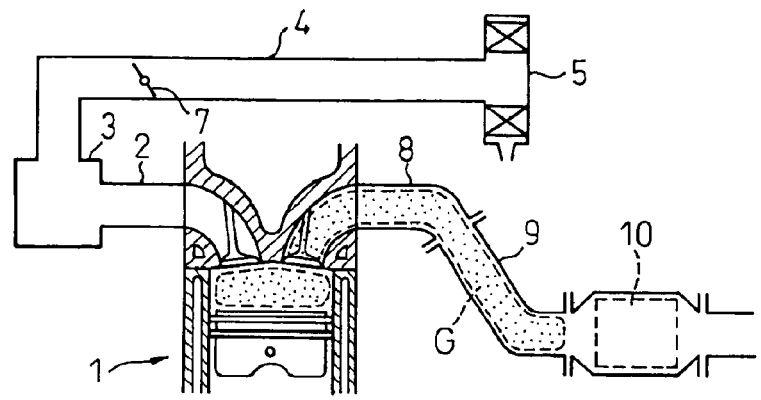
FIGS. 8A–8C are schematic illustrations for explaining the first embodiment according to the present invention.
Figure 8B:
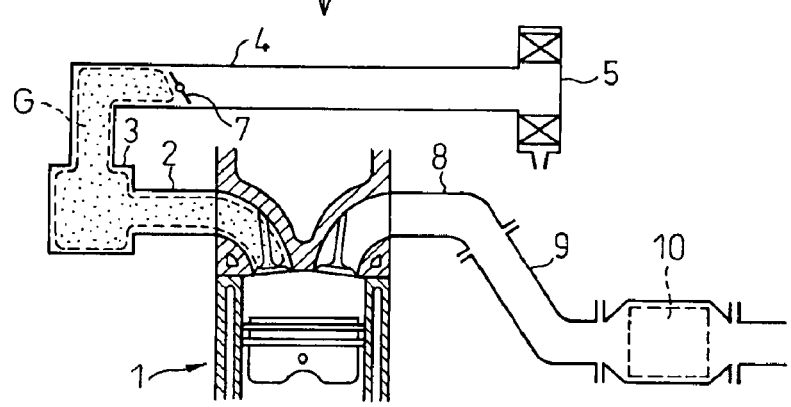

Accordingly, in the embodiments according to the present invention, as shown in FIG. 7, when the ignition switch is turned on as shown by an arrow X, the crankshaft 26 is first rotated reversely by a target amount of the reverse rotation TREV and then rotated forwardly, to start the engine. Specifically, as shown in FIG. 8A, the residual gas G containing unburned HC exists in the combustion chamber 17, the exhaust manifold 8 and the exhaust pipe 9, during the stoppage of the engine. When the crankshaft 26 is first rotated reversely to start the engine in this condition, the residual gas G in the combustion chamber 17, the exhaust manifold 8 and the exhaust pipe 9 is returned to the intake passage, which is comprised of the intake branch pipe 2, the surge tank 3 and the intake duct 4 downstream of the throttle valve 7 in the example shown in FIG. 8B. In addition, unburned HC adhered to the inner walls of the exhaust manifold 8, the exhaust pipe 9, the combustion chamber 17 and the intake passage during the stoppage of the engine, is detached from the inner walls by a gas flow generated at this time and returned to the intake passage.

Figure 8C:
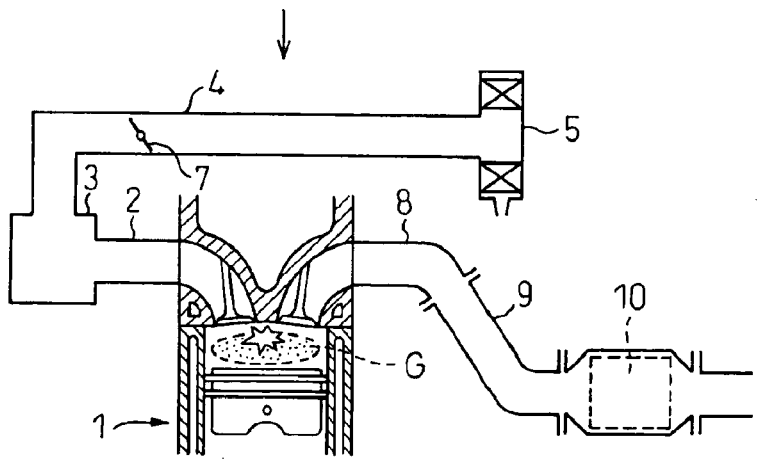

After that, when the crankshaft 26 is rotated forwardly, i.e., the rotational direction of the crankshaft 26 is switched from the reverse direction to the forward direction, the residual gas G is sucked from the intake passage into the combustion chamber 17 and burned in the combustion chamber 17, as shown in FIG. 8C. Accordingly, the residual gas containing unburned HC is suppressed to be discharged outside the engine at the engine start.

In addition, when the crankshaft 26 is first rotated reversely and then rotated forwardly as mentioned above, an amount of torque necessary to start the engine is reduced. When the engine is turned off, a transmission of the driving force to the crankshaft 26 is stopped. Thus, the crankshaft 26 fails to pass over the top dead center of compression of a certain cylinder and the rotation of the crankshaft 26 is thus stopped at a certain angular position. If the crankshaft 26 is driven to rotate forwardly from this angular position, a large amount of torque is necessary to start engine. However, if the crankshaft 26 is first rotated reversely to an angle position in which an amount of torque necessary to start the engine is small, and then rotated forwardly, the crankshaft 26 passes over the top dead center of compression relatively easily. In this way, an amount of torque necessary to start the engine is reduced. After that, when the ignition switch is turned off, the driving of the crankshaft 26 by the starter motor 28 is stopped.

In this connection, in the first embodiment according to the present invention, when the crankshaft 26 is rotated reversely, the fuel injection by the fuel injector 19 and the ignition by the ignition plug 18 are stopped. When the crankshaft 26 is then rotated forwardly, the fuel injection and the ignition are started as in the conventional cranking. In addition, in the first embodiment, the throttle valve 7 is opened slightly, the purge control valve 38 is fully closed, and the exhaust throttle valve 13 is fully opened, during the cranking.

How much the crankshaft 26 must be rotated reversely, i.e., the target amount of the reverse rotation (or the rotating number, the rotating time, or the crank angle, in the reverse direction) of the crankshaft 26, may be set according to different aspects. Next, this will be explained below with reference to FIG. 9. Note that an arrow Y in FIG. 9 indicates a position of the crankshaft 26 when the engine must be started.

As can be understood from the above explanations, when the crankshaft 26 is rotated reversely, the residual gas in the combustion chamber 17 is discharged into the intake passage if the intake valve 21 is turned opened.

Figure 9:
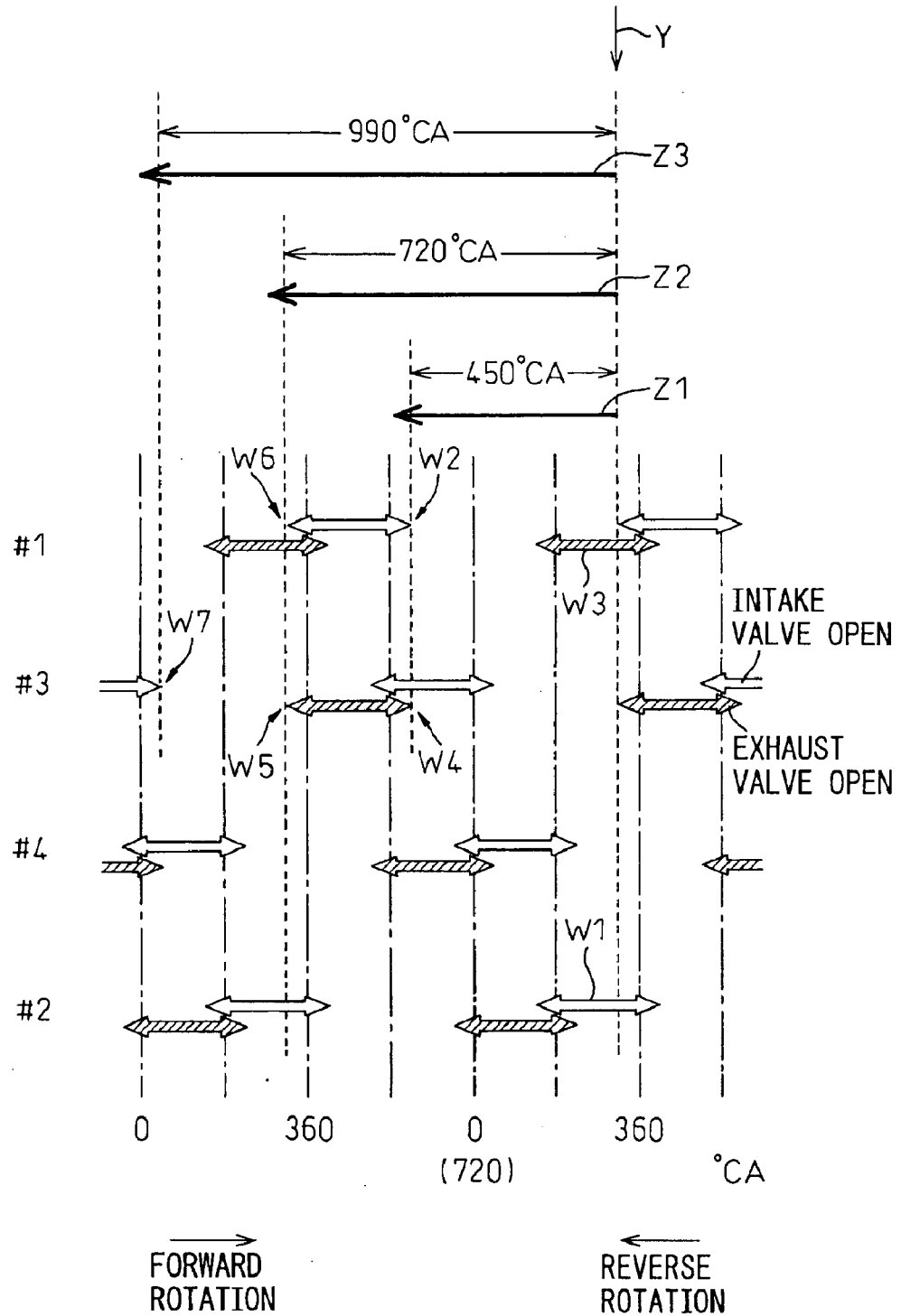
FIG. 9 is a diagram for explaining a target amount of the reverse rotation according to the first embodiment of the present invention.

In the example shown in FIG. 9, when the reverse rotation of the crankshaft 26 is started (Y), first, the residual gas is discharged from the combustion chamber 17 to the intake passage in the No. 2 cylinder #2, as shown by W1 in FIG. 9. Next, the discharge of the residual gas from the combustion chamber 17 to the intake passage is conducted in the No. 4 cylinder #4 and the No. 3 cylinder #3, sequentially. Next, when the crankshaft 26 is rotated reversely by about 450° CA, the discharge of the residual gas is started in the No. 1 cylinder #1, as shown by W2 in FIG. 9.

Accordingly, in order to conduct the discharge of the residual gas from the combustion chamber 17 to the intake passage in all cylinders, it is necessary to set the target amount of the reverse rotation larger than about 450° CA, as shown by arrow Z1 in FIG. 9.

Contrarily, when the crankshaft 26 is rotated reversely, the residual gas in the exhaust passage is sucked into the combustion chamber 17 if the exhaust valve 23 is made open, and then discharged into the intake passage if the exhaust valve 23 is then made open. In other words, when the exhaust valve 23 is made open and then the intake valve 21 is made opened in a certain cylinder, the residual gas in the exhaust passage is discharged to the intake passage via the combustion chamber 17 of the above-mentioned cylinder.

In the example shown in FIG. 9, when the reverse rotation of the crankshaft 26 is started (y), first, the suction of the residual gas from the exhaust passage to the combustion chamber 17 is started in the No. 1 cylinder #1, as shown by W3 in FIG. 9. Next, when the crankshaft 26 is rotated reversely by about 450° CA, the discharge of the residual gas is started in the No. 1 cylinder #1, as shown by W2 in FIG. 9.

Accordingly, in order to conduct the discharge of the residual gas from the exhaust passage into the intake passage in at least one cylinder, it is necessary to set the target amount of the reverse rotation larger than about 450° CA, as shown by arrow Z1 in FIG. 9.

Further, in the example shown in FIG. 9, next to the No. 1 cylinder #1, the suction of the residual gas from the exhaust passage into the combustion chamber 17 is conducted in the No. 2 cylinder #2 and the No. 4 cylinder #4, sequentially. Next, when the crankshaft 26 is rotated reversely by about 450° CA, the suction of the residual gas from the exhaust passage into the combustion chamber 17 is started in the No. 3 cylinder #3, as shown by W4 in FIG. 9.

Accordingly, in order to conduct the suction of the residual gas from the exhaust passage into the combustion chamber 17 in all cylinders, it is necessary to set the target amount of the reverse rotation larger than about 450° CA, as shown by arrow Z1 in FIG. 9.

On the other hand, in the example shown in FIG. 9, when the reverse rotation of the crankshaft 26 is started, the suction of the residual gas from the exhaust passage into the combustion chamber 17 is conducted sequentially in the No. 1 cylinder #1, the No. 2 cylinder #2, the No. 4 cylinder #4 and the No. 3 cylinder #3. Next, when the crankshaft 26 is rotated reversely by about 720° CA, the residual gas in the exhaust passage is sucked to the combustion chamber 17 by the cylinder volume, in all cylinders, as shown by W5 in FIG. 9.

Alternatively, in the No. 1 cylinder #1, after the suction of the residual gas from the exhaust passage into the combustion chamber 17 is first conducted and the discharge of the residual gas is then conducted, when the crankshaft 26 is rotated reversely by about 720° CA, the discharge of the residual gas from the combustion chamber 17 into the intake passage in the No. 1 cylinder #1 is completed, as shown by W6 in FIG. 9.

Accordingly, in order to suck the residual gas from the exhaust passage into the combustion chamber 17 by the cylinder volume in all cylinders, or in order to complete the discharge of the residual gas from the exhaust passage into the intake passage in at least one cylinder, it is necessary to set the target amount of the reverse rotation larger than about 720° CA as shown by arrow Z2 in FIG. 9.

Further, in the example shown in FIG. 9, when the reverse rotation of the crankshaft 26 is started, first, the discharge of the residual gas from the exhaust passage into the intake passage is conducted in the No. 1 cylinder #1. Next, the discharge of the residual gas is conducted in the No. 2 cylinder #2 and the No. 4 cylinder #4, sequentially. Next, when the crankshaft 26 is rotated reversely by about 990° CA, the discharge of the residual gas into the intake passage is started in the No. 3 cylinder #3, as shown by W7 in FIG. 9.

Accordingly, in order to discharge the residual gas from the exhaust passage into the intake passage in all cylinders, it is necessary to set the target amount of the reverse rotation larger than about 990° CA, as shown by arrow z3 in FIG. 9.

Further alternatively, the target amount of the reverse rotation of the crankshaft 26 may be set to discharge the gas into the intake passage by a total volume of the combustion chamber 17, the exhaust manifold 8 and the exhaust pipe 9.

In this way, the lower limit of the target amount of the reverse rotation of the crankshaft 26 may be set.

On the other hand, in the first embodiment according to the present invention, the upper limit of the target amount of the reverse rotation of the crankshaft 26 is set to prevent the gas having flowed backwardly into the intake passage from being discharged outside from the air inlet 5a of the air cleaner 5. This is because, if an amount of the reverse rotation of the crankshaft 26 is set excessively large, the residual gas containing unburned HC may leak out from the air inlet 5a of the air cleaner 5 into the atmospheric air.

In the first embodiment according to the present invention, the target amount of the reverse rotation is set in advance between the upper and lower limits which are set as mentioned above, and the crankshaft 26 is first rotated reversely by the target amount of the reverse rotation and then rotated forwardly, to start the engine.

Figure 10:
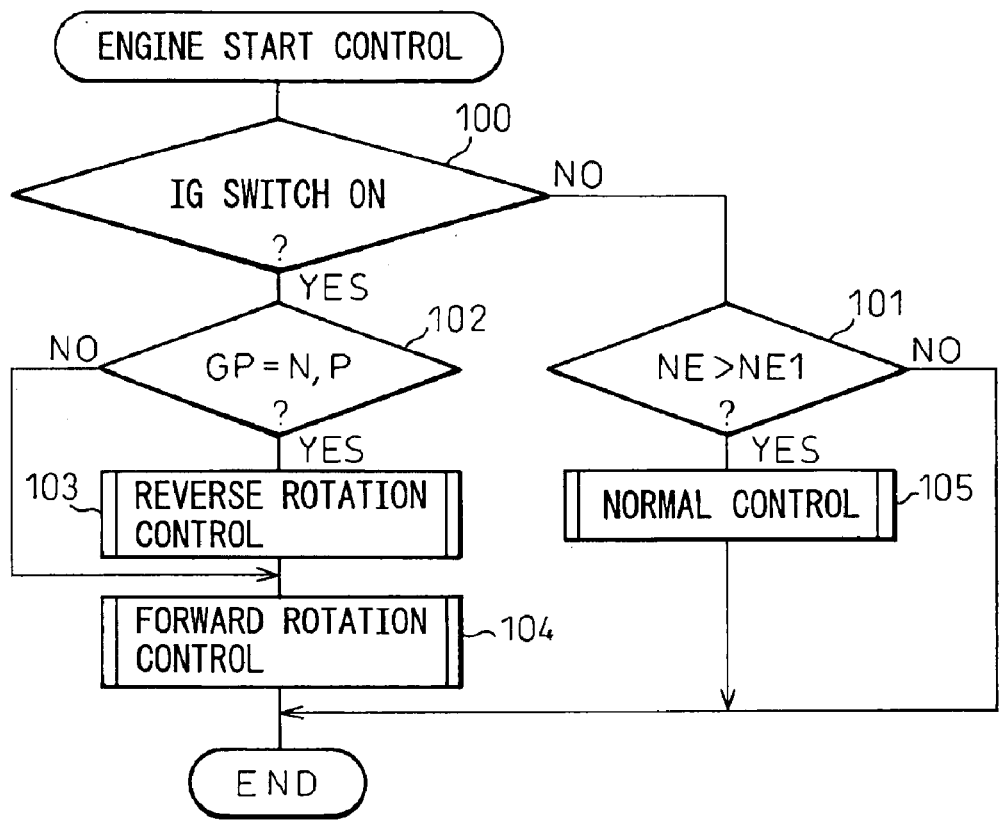
FIG. 10 is a flowchart showing an engine start control routine according to the first embodiment of the present invention.

FIG. 10 shows an engine start control routine according to the first embodiment of the present invention. This routine is executed by interruption every predetermined time.

Referring to FIG. 10, first, in step 100, it is judged whether the ignition switch is turned on. If the ignition switch is turned off, the program proceeds to step 101, where it is judged whether the engine speed NE is higher than a predetermined setting value NE1. If NE≦NE1, the processing cycle is completed.

When the ignition switch is turned from off to on, the program proceeds from step 100 to step 102, where it is judged whether the gear position (GP) of the transmission is at the neutral (N) or the parking (P) position. If GP=N or P, i.e., the crankshaft 26 is not connected to the axle, the program proceeds to step 103, and the reverse rotation control routine is executed. The reverse rotation control routine is shown in FIG. 11.

Figure 11:
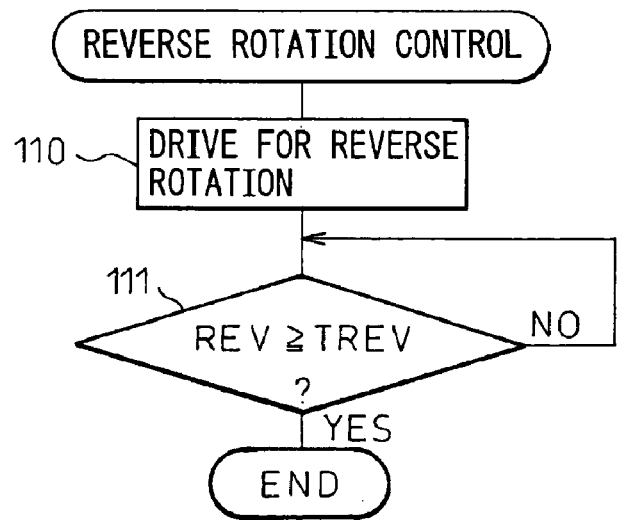
FIG. 11 is a flowchart showing a reverse rotation control routine according to the first embodiment of the present invention.

Referring to FIG. 11, first, in step 110, the crankshaft 26 is driven to rotate reversely by the starter motor 28. In this case, when the crankshaft 26 is rotated reversely, lubricant may not be supplied by the oil pump 30 and thus a seizure may occur in the crankshaft 26 or the piston 16. Therefore, according to the embodiments of the present invention, the rotational speed of the starter motor 28 is controlled to prevent the rotational speed of the crankshaft 26 in the reverse direction from exceeding an allowable speed, which is predetermined to prevent a seizure such as about 400 rpm.

In the following step 111, it is judged whether the amount of the reverse rotation REV of the crankshaft 26 is larger than the target amount of the reverse rotation TREV. There may exist different ways to judge whether the amount of the reverse rotation REV is larger than the target amount of the reverse rotation TREV. For example, the rotated angle of the crankshaft 26 in the reverse direction is detected by the crank angle sensor 32, and it is judged that REV≧TREV when the detected angle in the reverse direction exceeds an angle corresponding to the target amount of the reverse rotation TREV. Alternatively, based on the fact that the gas passes through the air flow meter 53 in the reverse direction when the gas is discharged from the combustion chamber 17 into the intake passage, an amount of the gas passing through the air flow meter 53 when the crankshaft 26 is rotated reversely is detected, and it is judged that REV≧TREV when the detected volume of the gas exceeds a volume corresponding to the target amount of the reverse rotation TREV.

If REV<TREV, the program returns to step 111. When REV≧TREV, the processing cycle is completed.

Referring to FIG. 10 again, the program proceeds from step 103 to step 104, where the forward rotation control is executed. Specifically, the crankshaft 26 is drive to rotate forwardly by the starter motor 2B, and the fuel injection by the fuel injector 19 and the ignition by the ignition plug 18 are respectively started.

Next, when the ignition switch is turned from on to off and NE>NE1 at this time, it is judged that the engine start is completed, and the program proceeds from steps 100, 101 to step 105 where the normal engine control is executed.

On the other hand, when GP≠N or P in step 102, i.e., the crankshaft 26 is connected to the axle, the program jumps to step 104 where the forward rotation control is executed. Specifically, in this case, the engine is started with the crankshaft 26 being rotated forwardly without being rotated reversely. Accordingly, from another point of view, in the first embodiment according to the present invention, two engine starting operations can be switched according to a condition of the vehicle at the time of the engine having to be started: the first operation is that the crankshaft 26 is first rotated reversely and then rotated forwardly; and the second operation is that the crankshaft 26 is rotated forwardly without being rotated reversely.

Next, the second embodiment according to the present invention will be explained below.

Figure 12:
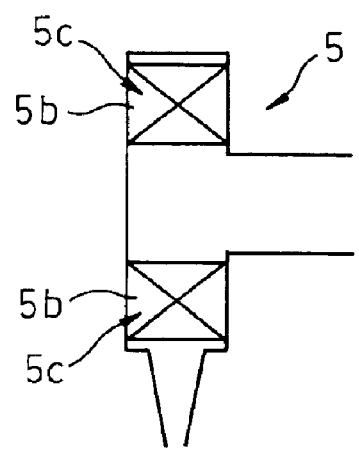
FIG. 12 is an enlarged view showing an air cleaner according to the second embodiment of the present invention.

In the second embodiment according to the present invention, a HC storing agent for temporarily storing HC therein is arranged in the intake passage between the air inlet 5a of the air cleaner 5 and the intake valve 21a. Specifically, a HC adsorbing agent 5c such as activated carbon is provided on the air cleaner element 5b, as shown in FIG. 12.

Therefore, when the residual gas flows out from the air inlet 5a of the air cleaner 5 during the reverse rotation of the crankshaft 26, unburned HC in the residual gas is adsorbed in the HC adsorbing agent 5c and is thus prevented from being discharged outside the engine. This eliminates the upper limit of the target amount of the reverse rotation of the crankshaft 26. In other words, the amount of the reverse rotation of the crankshaft 26 is not limited. Note that the unburned HC adsorbed in the HC adsorbing agent 5c is gradually released by the air passing through the HC adsorbing agent 5c when the crankshaft 26 is rotated forwardly thereafter, and the thus released unburned HC is burned in the combustion chamber 17.

In this connection, as mentioned above, unburned HC may exist on the inner walls of the combustion chamber 17 and the exhaust passage upstream of the catalyst 10 when the engine must be started. An amount of unburned HC adhered to the inner wall increases, as the engine temperature when the engine must be started is low.

On the other hand, when the crankshaft 26 is rotated reversely to start the engine, to thereby generate a gas flow in the combustion chamber 17 and the exhaust passage, the unburned HC is released from the inner walls and returned to the intake passage. In this case, an amount of the unburned HC released from the inner walls increases as an amount of the reverse rotation of the crankshaft 26 increases.

Figure 13:
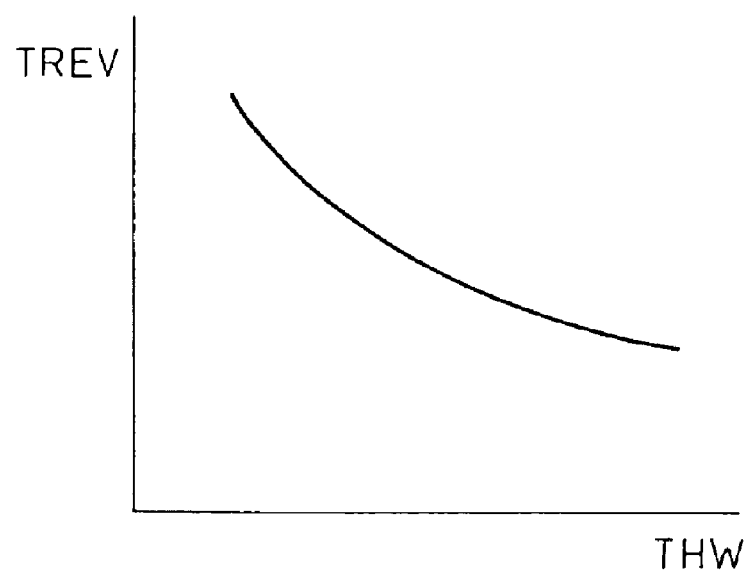
FIG. 13 is a diagram showing a target amount of the reverse rotation according to the second embodiment of the present invention.

Therefore, according to the second embodiment of the present invention, the engine cooling water temperature THW representing the engine temperature is detected when the engine must be started, and the target amount of the reverse rotation TREV of the crankshaft 26 is set to be larger as the engine cooling water temperature THW is lower, as shown in FIG. 13. In this case, the target amount of the reverse rotation TREV is stored in ROM 42 in advance in the form of a map shown in FIG. 13. Note that the temperature representing the engine temperature may be the engine lubricant temperature, the gas temperature in the intake or exhaust passage, or the atmospheric air temperature.

Figure 14:
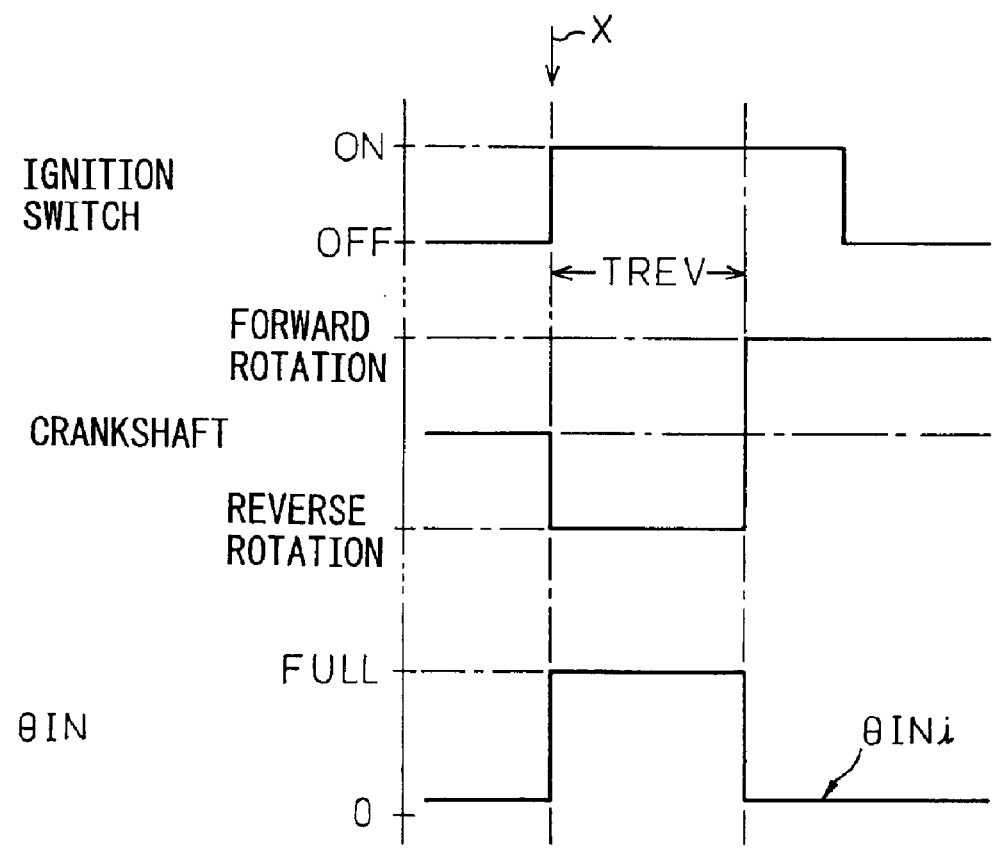
FIG. 14 is a diagram for explaining the second embodiment according to the present invention.

Further, in the second embodiment according to the present invention, when the crankshaft 26 is rotated reversely, the opening degree θIN of the throttle valve 7 is made "FULL" representing that the throttle valve 7 is fully opened, as shown in FIG. 14. This facilitates the residual gas flowing from the exhaust passage to the combustion chamber and from the combustion chamber to the intake passage.

After that, the crankshaft 26 is rotated forwardly, and the opening degree of the throttle valve θIN is reduced to a small opening degree θINi for idling, for example.

Figure 15:
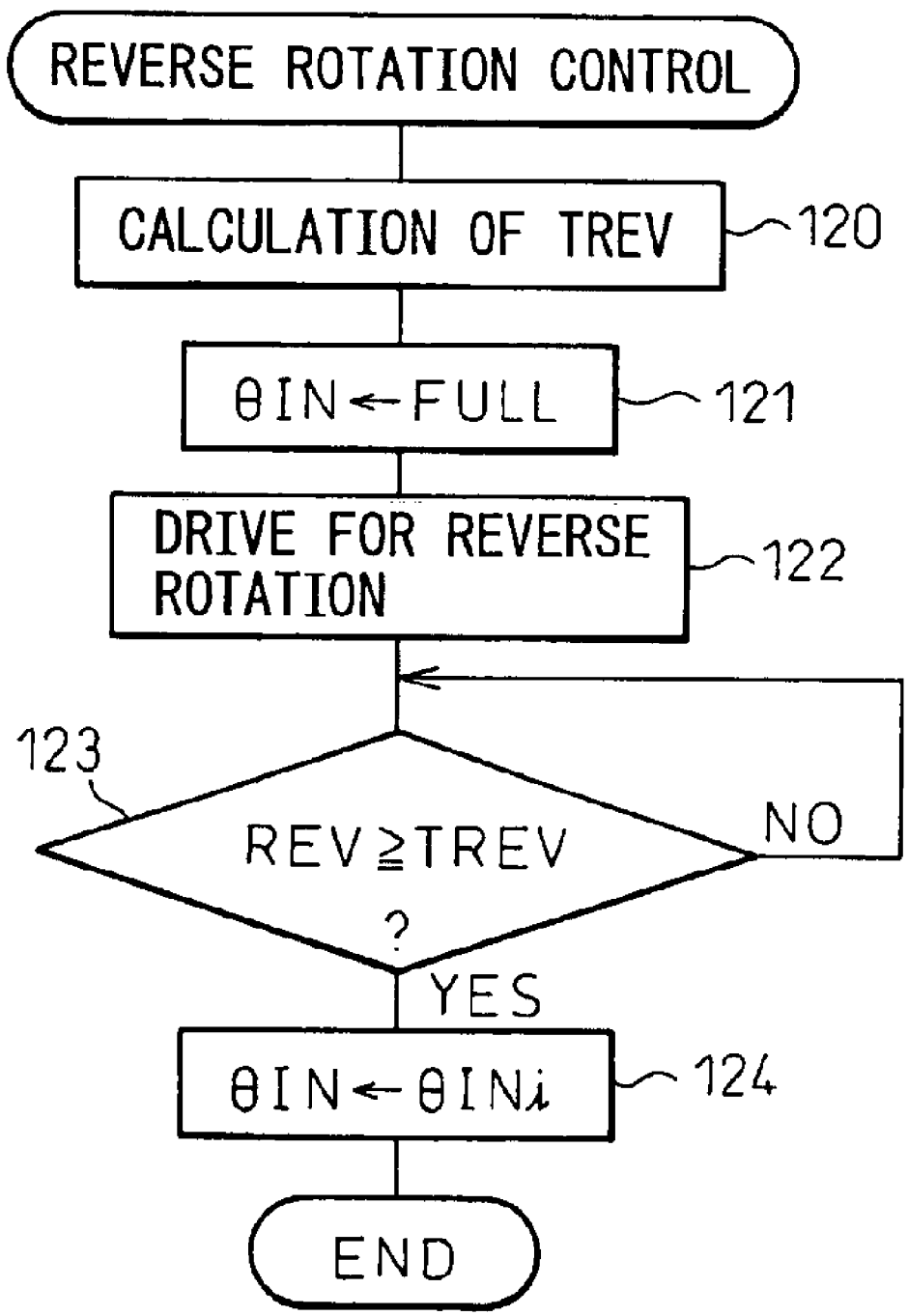
FIG. 15 is a flowchart showing a reverse rotation control routine according to the second embodiment of the present invention.

FIG. 15 shows a reverse rotation control routine according to the second embodiment of the present invention. This routine is executed in step 103 of the engine start control routine shown in FIG. 10.

Referring to FIG. 15, first, in step 120, the target amount of the reverse rotation TREV is calculated from the map shown in FIG. 13. Next, in step 121, the opening degree of the throttle valve θIN is made to be FULL, i.e., the throttle valve 7 is fully opened. In the following step 122, the crankshaft 26 is driven to rotate reversely by the starter motor 28. In the following step 123, it is judged whether the amount of the reverse rotation REV of the crankshaft 26 is equal to or larger than the target amount of the reverse rotation TREV. If REV<TREV, the program returns to step 123. If REV≧TREV, the program proceeds to step 124, and the opening degree of the throttle valve θIN is made to be the idling opening degree θINi. Then, the processing cycle is completed.

The other structures and operations of the second embodiment according to the present invention are the same as those of the first embodiment according to the present invention. Therefore, the explanations therefor are omitted.

Next, the third embodiment according to the present invention will be explained below with reference to FIG. 16.

Figure 16:
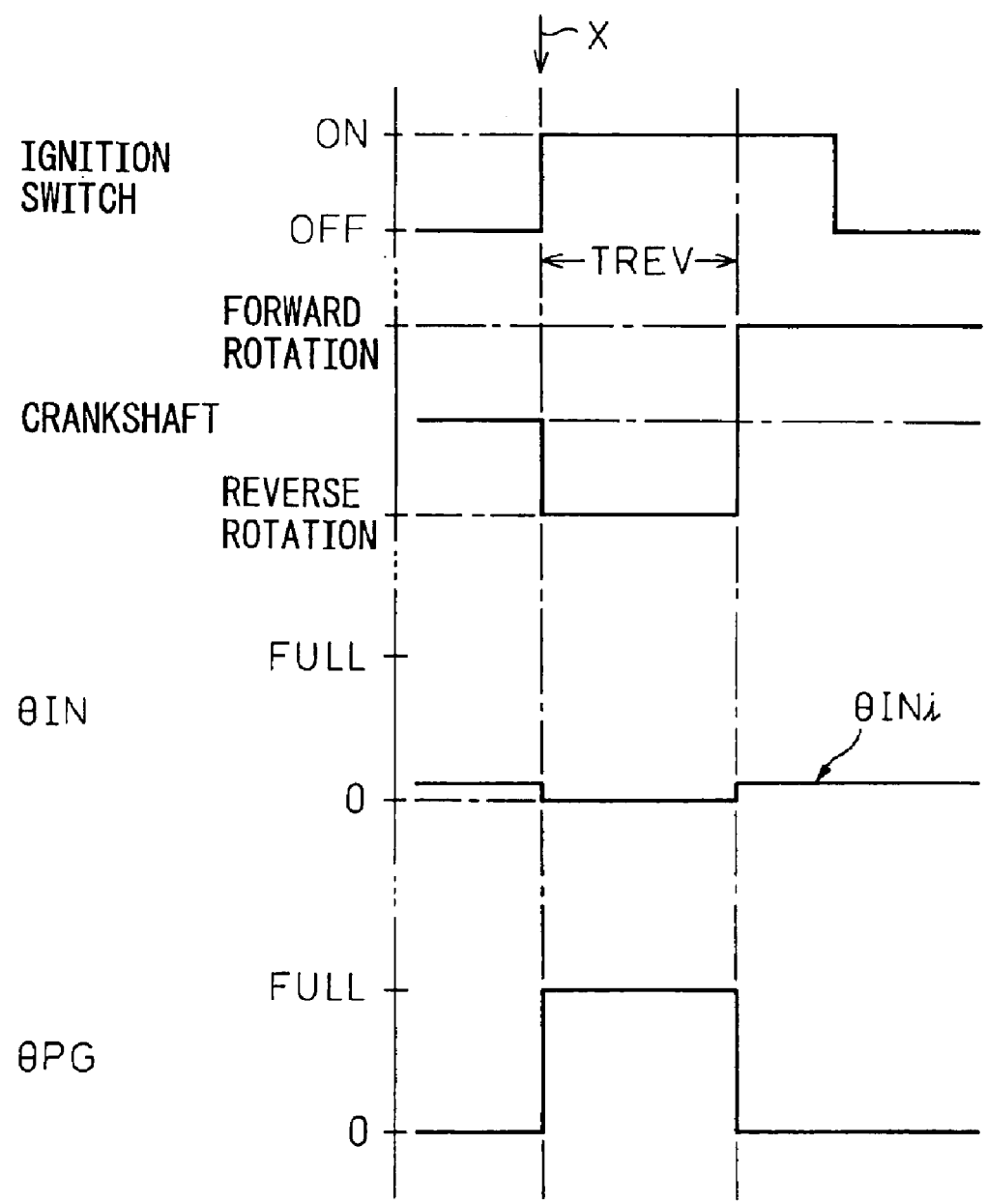
FIG. 16 is a diagram for explaining the third embodiment according to the present invention.

According to the third embodiment of the present invention, when the crankshaft 26 is rotated reversely, the opening degree of the throttle valve θIN is made to be zero, i.e., the throttle valve 7 is fully closed, and the opening degree of the purge control valve 38 is made to be FULL, i.e., the purge control valve 38 is fully opened, as shown in FIG. 16.

As a result, the residual gas having flowed backwardly to the intake passage is introduced into the canister 35, and unburned HC contained in the residual gas is adsorbed in the adsorbing layer 35. Accordingly, the unburned HC is removed from the residual gas. Therefore, it eliminates the upper limit of the target amount of the reverse rotation of the crankshaft 26, as in the second embodiment according to the present invention. A gasoline engine is conventionally provided with such a canister and, therefore, there is no need to provide additional parts or devices to eliminate the upper limit of the target amount of the reverse rotation.

After that, the opening degree of the throttle valve θIN is made to be the idling opening degree θINi and the opening degree of the purge control valve θPG is reduced to be zero while the crankshaft 26 is rotated forwardly, as shown in FIG. 16.

Figure 17:
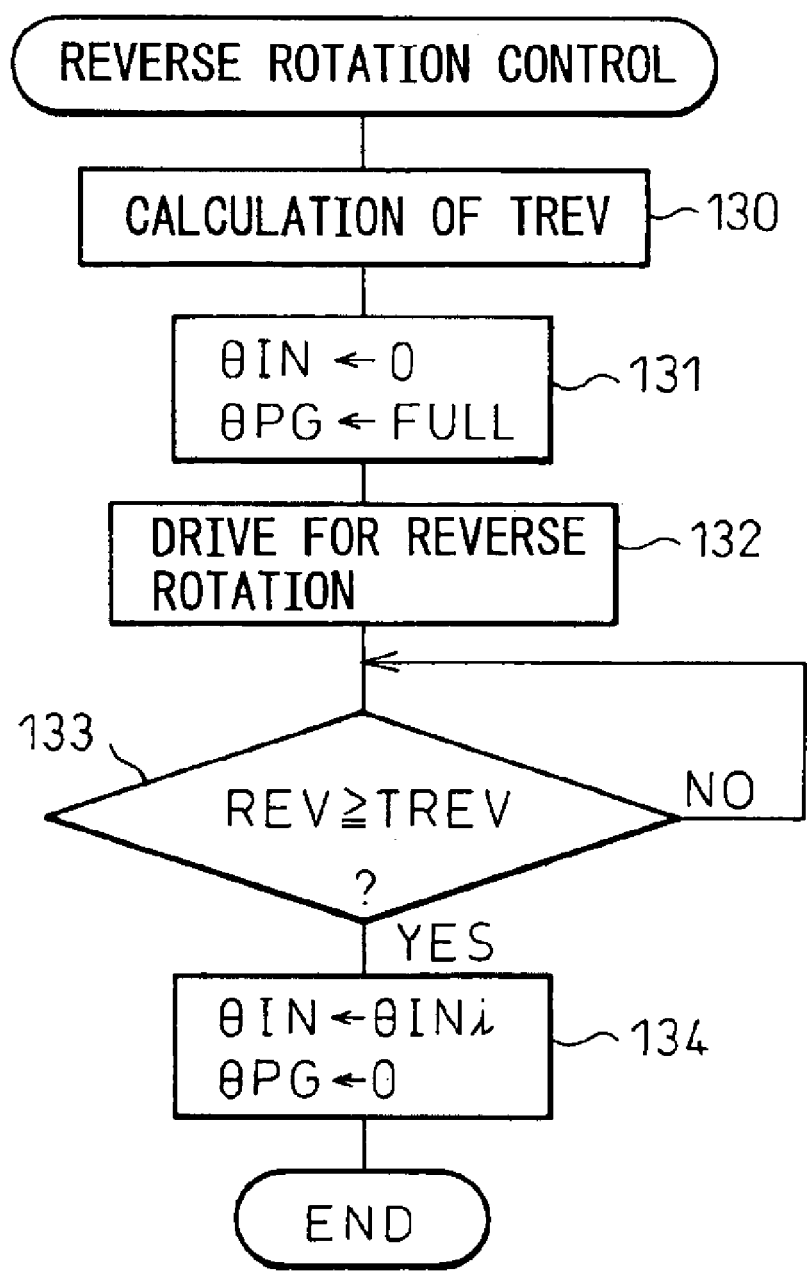
FIG. 17 is a flowchart showing a reverse rotation control routine according to the third embodiment of the present invention.

FIG. 17 shows the reverse control routine according to the third embodiment of the present invention. This routine is executed in step 103 of the engine start control routine shown in FIG. 10.

Referring to FIG. 17, first, in step 130, the target amount of the reverse rotation TREV is calculated from the map shown in FIG. 13. In the following step 131, the opening degree of the throttle valve θIN is made to be zero representing the full close, and the opening degree of the purge control valve θPG is made to be FULL representing the full open. In the following step 132, the crankshaft 26 is driven to rotate reversely by the starter motor 28. In the following step 133, it is judged whether the amount of the reverse rotation REV of the crankshaft 26 is equal to or larger than the target amount of the reverse rotation TREV. If REV<TREV, the program returns to step 133. If REV≧TREV, the program proceeds to step 134, and the opening degree of the throttle valve 61N is made to be the idling opening degree θINi, and the opening degree of the purge control valve θPG is made to be zero. Then, the processing cycle is completed.

The other structures and operations of the third embodiment according to the present invention are the same as those of the second embodiment according to the present invention. Therefore, the explanations therefor are omitted.

Next, the fourth embodiment according to the present invention will be explained below with reference to FIG. 18.

Figure 18:
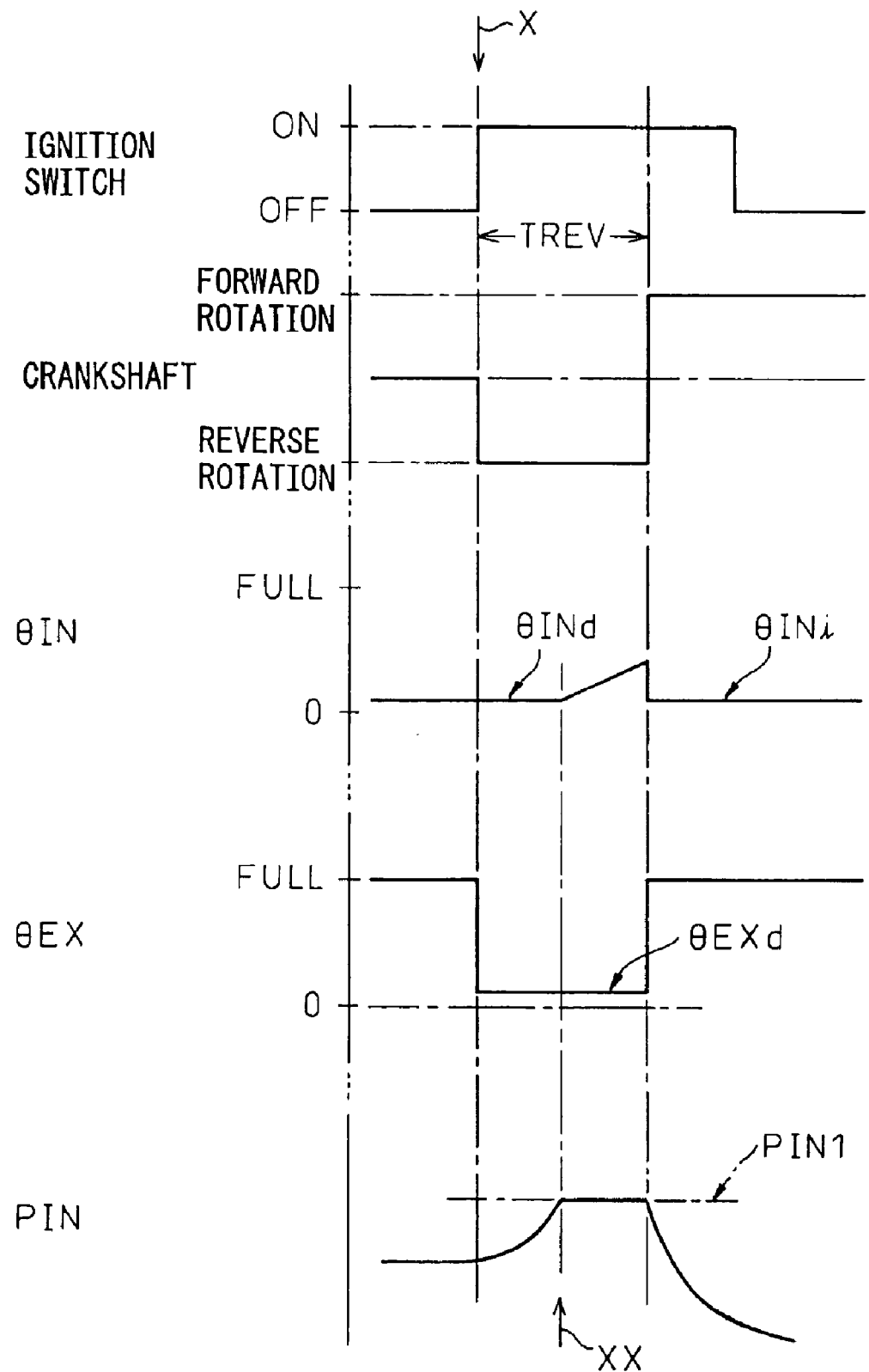
FIG. 18 is a diagram for explaining the fourth embodiment according to the present invention.

According to the fourth embodiment according to the present invention, when the crankshaft 26 is rotated reversely, the opening degree of the throttle valve θIN is made to be a small opening degree θINd, and the opening degree of the exhaust throttle valve θEX is made to be another small opening degree θExd, as shown in FIG. 18. At this time, the purge control valve 38 is kept fully closed. As a result, pressure in the combustion chamber 17, the exhaust pipe 9 upstream of the exhaust throttle valve 13 and the exhaust manifold 8 is reduced and, accordingly, unburned HC adhered to the inner walls of them is easily detached therefrom.

In this case, the residual gas existing between the combustion chamber 17 and the exhaust throttle valve 13 is mainly sucked into the combustion chamber 17 and discharged into the intake passage. Accordingly, in the fourth embodiment according to the present invention, the volume of the intake passage which lies between the air inlet 5a of the air cleaner 5 and the intake valve 21 is made equal to or larger than those of the combustion chamber 17 and the exhaust passage which lie between the intake valve 21 and the exhaust throttle valve 13.

The residual gas sucked into the combustion chamber 17 when the crankshaft 26 is rotated reversely is adiabatically compressed (see FIG. 6C.), and the temperature of the residual gas is increased. After that, the residual gas is discharged into the intake passage. This increases the temperature of the inner wall of the intake passage and, in turn, facilitates detaching of the unburned HC from the inner wall of the intake passage. Especially, in the case of an engine in which fuel is injected into the intake passage, this promotes atomization of fuel when the crankshaft 26 is rotated forwardly.

On the other hand, the opening degree of the throttle valve θIN is kept at the small degree θINd, as mentioned above and, therefore, pressure PIN in the intake passage between the throttle valve 7 and the intake valve 21 gradually increases as the time has elapsed, as shown in FIG. 18. When the intake passage pressure PIN becomes high, it may become difficult for the residual gas to flow from the combustion chamber 17 or the exhaust passage into the intake passage. In addition, there may be a case in that the intake duct 4 is damaged.

Therefore, in the fourth embodiment according to the present invention, if the intake passage pressure PIN exceeds a setting value PIN1, which is predetermined to be slightly smaller than an allowable upper limit pressure, during the reverse rotation of the crankshaft 26, the opening degree of the throttle valve θIN is made larger, as shown by arrow XX in FIG. 18. This prevents the intake passage pressure PIN from exceeding the allowable upper limit PIN1.

After that, the opening degree of the throttle valve θIN is made to be the idling opening degree θINi, and the opening degree of the exhaust throttle valve θEX is opened to be FULL representing the full open, while the crankshaft 26 is rotated forwardly, as shown in FIG. 18.

When the crankshaft 26 is rotated forwardly, the fuel injection and the ignition are started as mentioned above, and the combustion is thus started. In this case, an amount of HC contained in the gas flowing from the intake passage into the combustion chamber 17 is larger than that when the crankshaft 26 is not rotated reversely. Accordingly, the fuel injection amount Q0 when the crankshaft 26 is rotated reversely and then rotated forwardly must be made smaller than that when the crankshaft 26 is rotated forwardly without being rotated reversely, and must be made smaller as the amount of HC existing in the intake passage when forward rotation of the crankshaft 26 must be started becomes larger.

Figure 19:
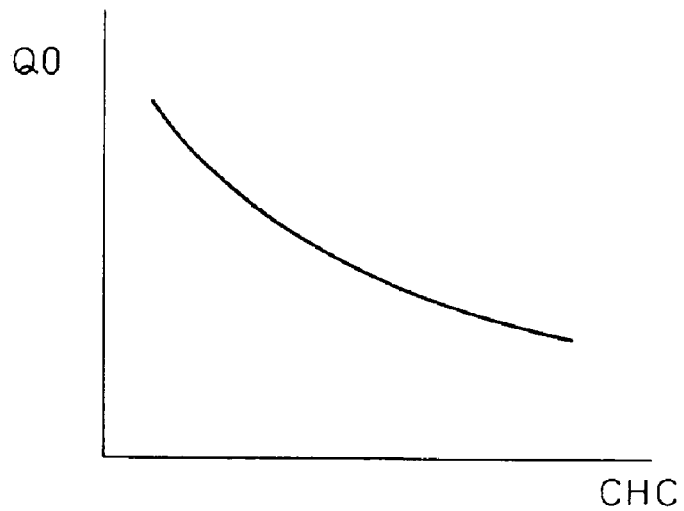
FIG. 19 is a diagram showing the fuel injection amount Q0 when the crankshaft is rotated forwardly, according to the fourth embodiment of the present invention.

Accordingly, in the fourth embodiment according to the present invention, a concentration CHC of HC in the intake passage when the reverse rotation of the crankshaft 26 is completed is detected by the HC concentration sensor 52, and the fuel injection amount Q0 when the crankshaft 26 is rotated forwardly is made smaller as the detected HC concentration CHC is higher, as shown in FIG. 19. Note that the fuel injection amount Q0 is stored in ROM 42 in advance in the form of a map shown in FIG. 19.

In this connection, the concentration of oxygen in the gas in the intake passage also represents the amount of HC in the intake passage. Accordingly, an oxygen concentration sensor may be attached to the intake passage, and the fuel injection amount Q0 when the crankshaft 26 is rotated forwardly may be set based on an output of the oxygen concentration sensor.

Figure 20:
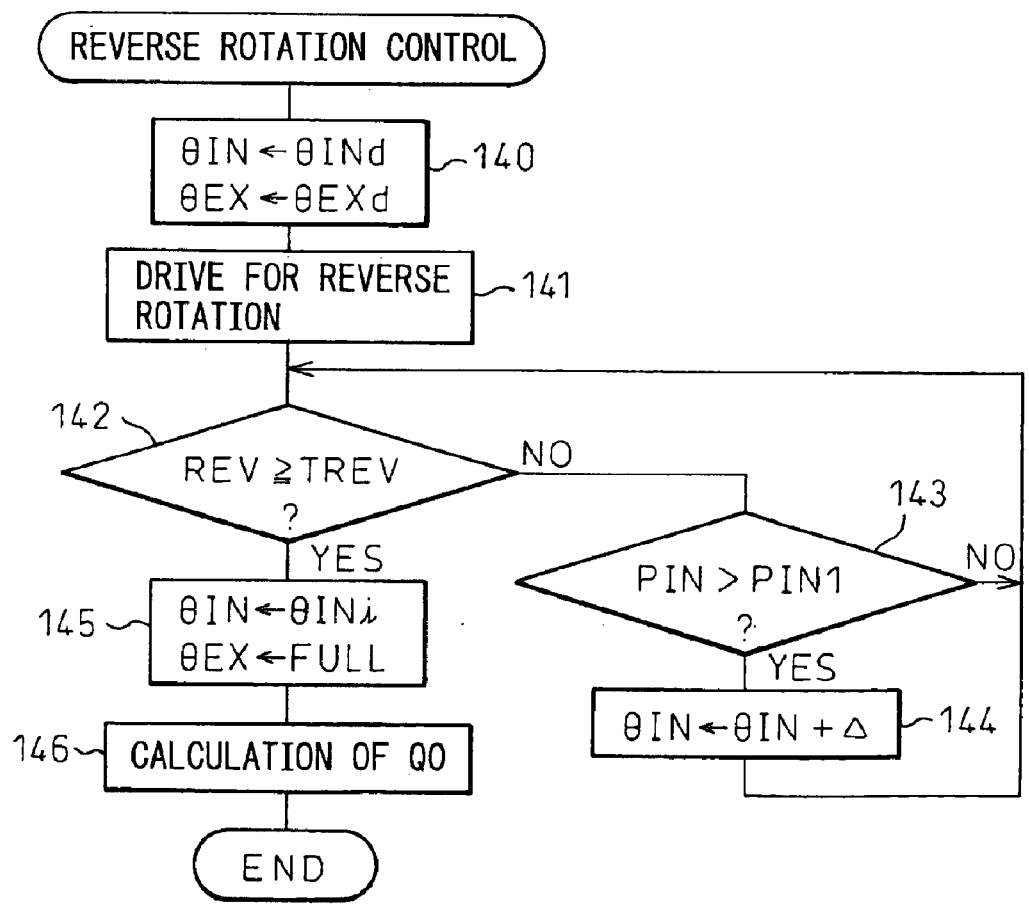
FIG. 20 is a flowchart showing a reverse rotation control routine according to the fourth embodiment of the present invention.

FIG. 20 shows a reverse rotation control routine according to the fourth embodiment of the present invention. This routine is executed in step 103 in the routine of engine start shown in FIG. 10.

Referring to FIG. 20, first, in step 140, the opening degrees of the throttle valve θIN and of the exhaust throttle valve θEX are made to be the small opening degrees θINd and θEXd, respectively. In the following step 141, the crankshaft 26 is drive to rotate reversely by the starter motor 28. In the following step 142, it is judged whether the amount of the reverse rotation REV of the crankshaft 26 is equal to or larger than the predetermined target amount of the reverse rotation TREV. If REV<TREV, the program proceeds to step 143, where it is judged whether the intake passage pressure PIN is higher than the above-mentioned setting value PIN1. Here, it is judged whether the intake passage pressure PIN is higher than the setting value PIN1 based on the output of the pressure sensor 51 or the rotation number of the crankshaft 26 in the reverse direction. If PIN≦PIN1 in step 143, the program returns to step 142. If PIN>PIN1, the program proceeds to step 144 where the opening degree of the throttle valve θIN is increased by a small constant Δ (θIN=θIN+Δ), and then returns to step 142.

If REV≧TREV, the program proceeds from step 142 to step 145, and the opening degree of the throttle valve θIN is made to be the idling opening degree θINi and the opening degree of the exhaust throttle valve θEX is made to be FULL representing the full open. In the following step 146, the fuel injection amount Q0 is calculated based on the HC concentration CHC in the intake passage at this time, from the map shown in FIG. 19. Next, the processing cycle is completed. After that, when the crankshaft 26 is rotated forwardly, fuel is injected by the amount Q0.

The other structure and operation of the fourth embodiment according to the present invention are the same as those of the first embodiment according to the present invention. Therefore, the explanations therefor are omitted.

Next, the fifth embodiment according to the present invention will be explained below.

In the above-mentioned embodiments according to the present invention, the fuel injection and the ignition are not conducted when the crankshaft 26 is rotated reversely. Contrarily, in the fifth embodiment according to the present invention, the fuel injection and/or the ignition are conducted when the crankshaft 26 is rotated reversely. In this case, it is determined whether the fuel injection must be conducted and whether the ignition must be conducted, based on the condition of warming-up of the engine, which is represented by, for example, the engine cooling water temperature THW when the crankshaft 26 is rotated reversely.

Figure 21:
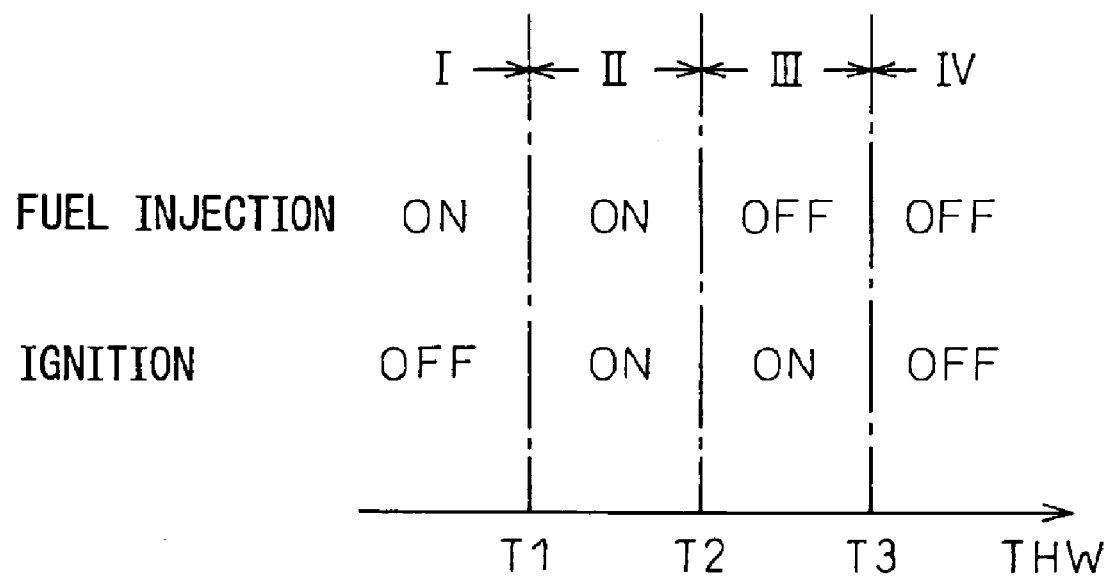
FIG. 21 is an illustration for explaining regions of an engine warming-up condition according to the fifth embodiment of the present invention.

Specifically, the warming-up condition of the engine is divided into, for example, four regions, based on the engine cooling water temperature THW when the crankshaft 26 is rotated reversely, as shown in FIG. 21.

In the first region I in which the engine cooling water temperature THW is lower than a first reference temperature T1, the fuel injection is executed and the ignition is stopped. In the second region II in which the engine cooling water temperature THW is not lower than the first reference temperature T1 and lower than a second reference temperature T2 (≧T1), both of the fuel injection and the ignition are executed. In the third region III in which the engine cooling water temperature THW is not lower than the second reference temperature T2 and lower than a third reference temperature T3 (≧T2), the fuel injection is stopped and the ignition is executed. In the fourth region IV in which the engine cooling water temperature THW is not lower than the third reference temperature T3, both of the fuel injection and the ignition are stopped. According to another aspect, the fuel injection is executed when THW≦T2 and is stopped when T2≧THW, and the ignition is executed when T1≧THW<T3 and is stopped when THW<T1 or T3≧THW.

In more detail, the fuel injection is conducted in the first region I. As a result, the fuel together with the residual gas is first moved backwardly into the intake passage, and then returned into the combustion chamber 17 when the crankshaft 26 is rotated forwardly. Specifically, a reciprocation of the gas flow between the combustion chamber 17 and the intake passage promotes atomization of fuel and, therefore, a good combustion is ensured at the forward rotation of the crankshaft 26, even if the engine cooling water temperature THW is low. In addition, due to the above, a so-called deposit, mainly made of solid carbon, deposited on the inner wall of the combustion chamber 17, the outer surface of the intake valves 21 and the inner wall of the intake passage, is washed away by the fuel in the form of liquid drops.

Here, when the fuel injection must be conducted during the reverse rotation of the crankshaft 26, the fuel injection is conducted when the intake valves 21 or the exhaust valves 23 are opened. When the intake valves 21 or the exhaust valves 23 are opened, a relatively large gas flow is generated in the combustion chamber 17 or the intake passage, which further promotes atomization of the injected fuel.

On the other hand, in the third region III, the ignition is executed. As a result, unburned HC contained in the residual gas is burned and removed therefrom. Accordingly, even when the target amount of the reverse rotation of the crankshaft 26 is set larger, there is no possibility that a large amount of unburned HC is discharged from the air inlet 5a of the air cleaner 5. Therefore, in the third region III, an amount of the reverse rotation of the crankshaft 26 may be made larger than those in the other regions. In other words, an amount of the reverse rotation is changed depending on the warming-up condition of the engine.

Further, when unburned HC is burned in this way, the gas at high temperature flows backwardly into the intake passage, which then returns back to the combustion chamber 17 when the crankshaft 26 is then rotated forwardly, and promotes atomization of fuel.

In the fifth embodiment according to the present invention, the ignition is conducted during the expanding operation (see FIG. 6B) or the discharging operation (see FIG. 6A) when the crankshaft 26 is rotated reversely.

This increases the temperature of the gas discharged from the combustion chamber 17 into the intake passage, and prevents the rotational speed of the crankshaft 26 in the reverse direction from being suddenly increased by the torque generated in such a combustion.

In the second region II, both of the fuel injection and the ignition are executed. In this case, unburned HC contained in the residual gas is burned together with the fuel injected from the fuel injector 19. In the second region II, the engine cooling water temperature THW is lower than that in the third region III and, thus, the unburned HC is difficult to burn. Therefore, the fuel injection is conducted in the second region II to promote the combustion of the unburned HC. In this case too, as in the first and third regions I and III, atomization of the fuel is promoted.

In the fourth region IV, both of the fuel injection and the ignition are stopped. This is because, in the fourth region IV where the engine cooling water temperature THW is relatively high, an amount of unburned HC adhered to the inner wall of the combustion chamber or the like is relatively small and friction is relatively small.

Note that, if the fuel injection or the ignition is conducted when the crankshaft 26 is rotated reversely, an amount of the fuel injection or the ignition timing at this time is controlled to prevent the oxygen concentration in the gas flowing into the combustion chamber 17 during the forward rotation of the crankshaft 26 from being lower than an amount required for combustion.

In this connection, an amount of the fuel injection is typically corrected to be increased at the engine start. This is because a part of the fuel injected from the fuel injector 19 is adhered to the inner wall of the combustion chamber 17 without being burned, and a ratio of an amount of the burned fuel to that of the total injected fuel, or a ratio of the fuel contributing to combustion, is low.

However, as mentioned above, the ignition is conducted in the second and third regions II and III, promoting atomization of fuel when the crankshaft 26 is rotated forwardly. This reduces the fuel injection amount Q0 when the crankshaft 26 is then rotated forwardly, as compared with that when the crankshaft 26 is rotated forwardly without being rotated reversely.

How much the fuel injection amount Q0 can be reduced depends on the degree of atomization of the fuel when the crankshaft 26 is rotated forwardly, and the latter depends on a combustion state when the crankshaft 26 is rotated reversely. The combustion state can be represented by the rotational speed RNE of the crankshaft 26 in the reverse direction. Specifically, the rotational speed RNE in the reverse direction will become high when a good combustion is obtained, but will not become as high when the combustion is insufficient. Note that the combustion state when the crankshaft 26 is rotated reversely may be represented by a change in the rotational speed RNE in the reverse direction, or by a temperature or pressure of the gas in the intake passage.

Figure 22A:
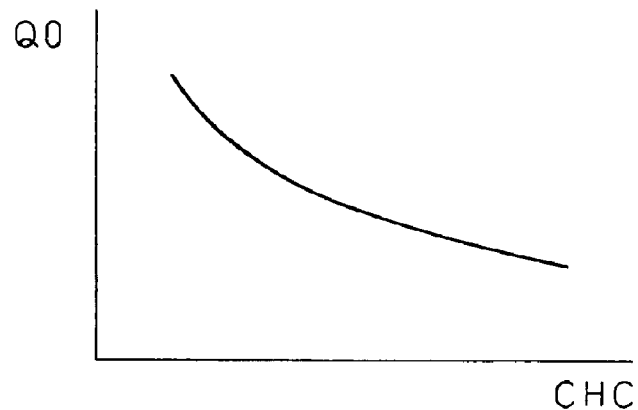
FIGS. 22A–22C are diagrams showing the fuel injection amount Q0 when the crankshaft is rotated forwardly, according to the fifth embodiment of the present invention.
Figure 22B:
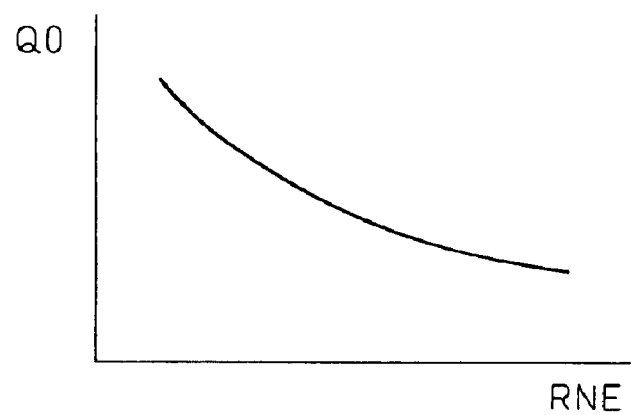
Figure 22C:
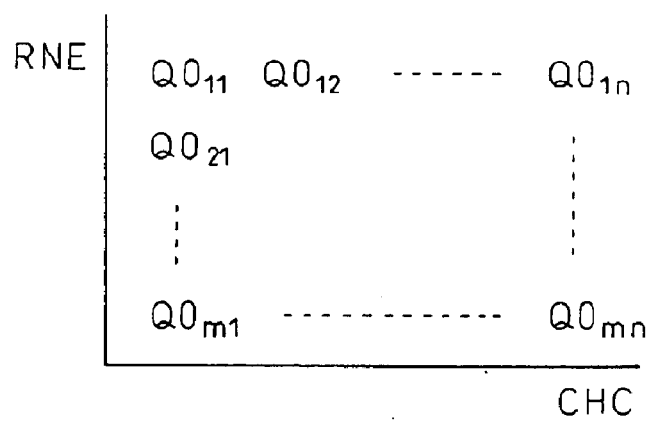

In the fifth embodiment according to the present invention, the fuel injection amount Q0 when the crankshaft 26 is rotated forwardly becomes smaller as the HC concentration CHC in the intake passage when the reverse rotation of the crankshaft 26 must be completed becomes high, as shown in FIG. 22A, and becomes smaller as the rotational speed RNE of the crankshaft 26 in the reverse direction when the reverse rotation of the crankshaft 26 must be completed becomes high, as shown in FIG. 22B. The fuel injection amount Q0 is stored in ROM 42 in advance in the form of a map shown in FIG. 22C as a function of the HC concentration CHC and the rotational speed RNE in the reverse direction.

Figure 23:
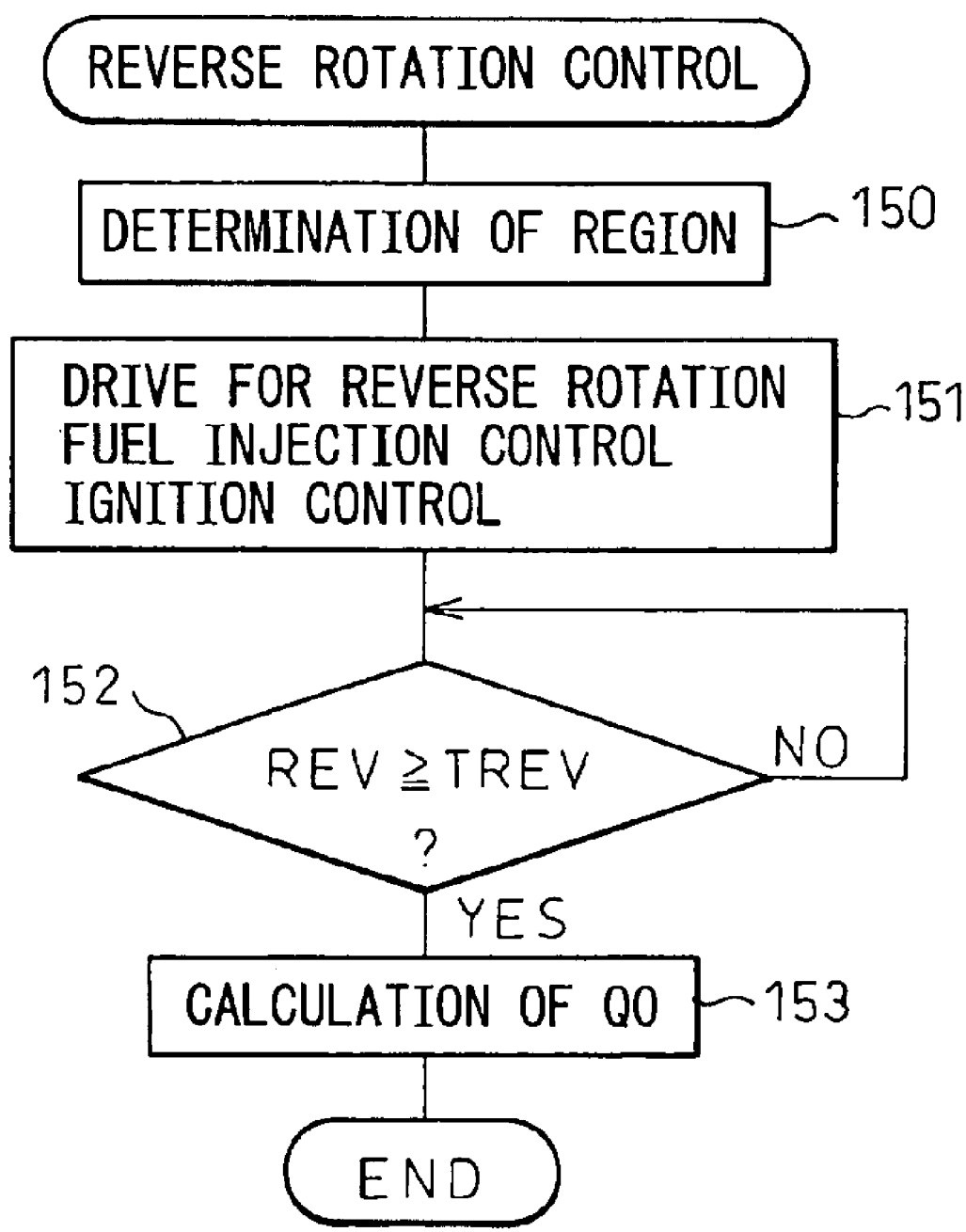
FIG. 23 is a flowchart showing a reverse rotation control routine according to the fifth embodiment of the present invention.

FIG. 23 shows a reverse rotation control routine according to the fifth embodiment of the present invention. The routine is executed in step 103 in the engine start control routine shown in FIG. 10.

Referring to FIG. 23, first, in step 150, the region is determined based on the engine cooling water temperature THW at this time, from the map shown in FIG. 21. In the following step 151, the crankshaft 26 is driven to rotate reversely by the starter motor 28, and the fuel injection and the ignition are controlled according to the region to which the engine cooling water temperature THW belongs (see FIG. 21). In this case, the fuel injection and the ignition are controlled to prevent the rotational speed RNE of the crankshaft 26 in the reverse direction from exceeding an allowable speed such as about 400 rpm.

In the following step 152, it is judged whether an amount of the reverse rotation REV of the crankshaft 26 is equal to or larger than the target amount of the reverse rotation TREV. If REV<TREV, the program returns to step 152. If REV≧TREV, the program proceeds to step 153, where the fuel injection amount Q0 when the crankshaft 26 is subsequently rotated forwardly is calculated based on the HC concentration CHC and the rotational speed RNE in the reverse direction, from the map shown in FIG. 23. Then, the processing cycle is completed.

The other structures and operations of the fifth embodiment according to the present invention are the same as those of the first embodiment according to the present invention. Therefore, the explanations therefor are omitted.

Next, the sixth embodiment according to the present invention will be explained below.

In the above-mentioned fifth embodiment according to the present invention, the ignition is conducted in all cylinders in the second and third regions II and III. However, combustion which may occur in all cylinders may reduce the oxygen concentration in the gas in the intake passage to an excessively low level, which may reduce the oxygen concentration in the gas flowing in the combustion chamber 17 when the crankshaft 26 is subsequently rotated forwardly to an excessively low level.

Therefore, in the sixth embodiment according to the present invention, the ignition is conducted only in some of the cylinders and is prohibited in the remaining cylinders, in the second and third regions II and III. As a result, a good combustion is ensured when the crankshaft 26 is subsequently rotated forwardly.

In this case, the fuel tends to be atomized easily in the cylinder(s) in which the ignition was conducted to cause a combustion during the reverse rotation, in comparison with the cylinder(s) in which the ignition was not conducted. Therefore, in the sixth embodiment according to the present invention, the fuel injection amount Q0 in the cylinder(s) in which the ignition was conducted, is set smaller than that in the cylinder(s) in which the ignition was not conducted.

FIG. 24 shows a reverse rotation control routine according to the sixth embodiment of the present invention. The routine is executed in step 103 in the engine start control routine shown in FIG. 10.

Referring to FIG. 24, first, in step 160, the region is determined based on the engine cooling water temperature THW, at this time, from the map shown in FIG. 21. In the following step 161, the crankshaft 26 is driven to rotate reversely by the starter motor 28, and the fuel injection and the ignition are controlled according to the region to which the engine cooling water temperature THW belongs (see FIG. 21). In this case, the fuel injection and the ignition are controlled to prevent the rotational speed RNE of the crankshaft 26 in the reverse direction from exceeding an allowable speed such as about 400 rpm. Further, the ignition is conducted only in a part of the cylinders when it must be conducted.

In the following step 162, it is judged whether the amount of the reverse rotation REV of the crankshaft 26 is equal to or larger than the target amount of the reverse rotation TREV. If REV<TREV, the program returns to step 162. If REV≧TREV, the program proceeds to step 163, where the fuel injection amount Q0 when the crankshaft 26 is subsequently rotated forwardly is calculated based on the HC concentration CHC and the rotational speed RNE in the reverse direction, from the map shown in FIG. 23. Then, the processing cycle is completed.

The other structure and operation of the sixth embodiment according to the present invention are the same as those of the fifth embodiment according to the present invention. Therefore, the explanations therefor are omitted.

According to the present invention, it is possible to provide a device for starting an engine, capable of suppressing a residual gas from being discharged outside the engine.

While the invention has been described by reference to specific embodiments chosen for purposes of illustration, it should be apparent that numerous modifications could be made thereto, by those skilled in the art, without departing from the basic concept and scope of the invention.

What is claimed is:

1. A device for starting an engine, the engine including a crankshaft, an intake passage, an exhaust passage, and a plurality of cylinders having respective combustion chambers, pistons, intake valves, and exhaust valves, the device comprising:
    means for setting a target amount of the reverse rotation of the crankshaft; and
    means for rotating the crankshaft first reversely by the target-amount of the reverse rotation and then rotating forwardly, to start the engine,
    wherein, when the crankshaft is rotated reversely, the piston displaces upwardly while the intake valve is opened within a crank angle range corresponding to the intake stroke during the forward rotation of the crankshaft, to thereby generate a backward gas flow from the combustion chamber to the intake passage, and
    wherein the target amount of the reverse rotation is set to generate the backward gas flow from the combustion chamber to the intake passage in all cylinders.

2. A device according to claim 1, wherein the target amount of the reverse rotation is set to prevent the gas having flowed backwardly to the intake passage from being discharged from an air inlet of the intake passage.

3. A device according to claim 2, wherein the intake passage which lies between the intake valve and the air inlet of the intake passage has a first volume, the exhaust passage which lies between the exhaust valve and a catalyst arranged in the exhaust passage has a second volume, and the combustion chamber and the exhaust passage which lie between the intake valve and the catalyst has a third volume, and wherein the first volume is substantially equal to or larger than the second or third volume.

4. A device according to claim 1, wherein the engine further includes an air cleaner arranged in the intake passage, and wherein the air cleaner comprises a hydrocarbon storing agent for temporarily storing hydrocarbon therein.

5. A device according to claim 1, wherein the engine further includes a throttle valve arranged in the intake passage and a canister for temporarily storing hydrocarbon therein communicated with the intake passage between the throttle valve and the intake valve via a purge control valve, and wherein the throttle valve is closed and the purge control valve is opened when the crankshaft is rotated reversely, to introduce the gas having flowed backwardly into the intake passage to the canister.

6. A device according to claim 1, wherein the engine further includes a throttle valve arranged in the intake passage, and wherein an opening degree of the throttle valve is controlled to prevent pressure in the intake passage from exceeding a predetermined allowable value when the crankshaft is rotated reversely.

7. A device according to claim 1, wherein the engine further includes a fuel injector for injecting fuel into the intake passage or the combustion chamber, and a spark plug, and wherein a fuel injection by the fuel injector and/or an ignition by the spark plug is conducted when the crankshaft is rotated reversely.

8. A device according to claim 7, wherein it is determined whether the fuel injection and/or the ignition must be conducted when the crankshaft is rotated reversely, based on the warming-up condition of the engine.

9. A device according to claim 7, wherein, if the fuel injection must be conducted when the crankshaft is rotated reversely, the fuel injection is conducted when the intake valve or the exhaust valve is opened.

10. A device according to claim 1, further comprising means for controlling the rotational speed of the crankshaft in the reverse direction to prevent it from exceeding a predetermined allowable speed.

11. A device according to claim 10, further comprising an electric motor for rotating the crankshaft forwardly or reversely, wherein the electric motor is controlled to prevent the rotational speed of the crankshaft in the reverse direction from exceeding the allowable speed.

12. A device according to claim 10, wherein the engine further includes a fuel injector for injecting fuel into the intake passage or the combustion chamber, and a spark plug, wherein a fuel injection by the fuel injector and/or an ignition by the spark plug is conducted when the crankshaft is rotated reversely, and wherein the fuel injection and/or the ignition is controlled to prevent the rotational speed of the crankshaft in the reverse direction from exceeding the allowable speed.

13. A device according to claim 1, wherein the cylinders have respective spark plugs, and wherein the ignition is conducted in a part of the cylinders and is prohibiting the ignition in the remaining cylinders when the crankshaft is rotated reversely.

14. A device according to claim 1, further comprising means for obtaining an engine temperature when the engine must be started, and wherein the target amount of the reverse rotation is set based on the obtained engine temperature.

15. A device according to claim 1, further comprising an exhaust throttle valve arranged in the exhaust passage, wherein the exhaust throttle valve is closed when the crankshaft is rotated reversely.

16. A device for starting an engine, the engine including a crankshaft, an intake passage, an exhaust passage, and at least one cylinder having a combustion chamber, a piston, an intake valve, and an exhaust valve, the device comprising:

means for setting a target amount of the reverse rotation of the crankshaft; and means for rotating the crankshaft first reversely by the target amount of the reverse rotation and then rotating forwardly, to start the engine, wherein, when the crankshaft is rotated reversely, the piston displaces downwardly while the exhaust valve is opened within a crank angle range corresponding to the exhaust stroke during the forward rotation of the crankshaft, to thereby generate a backward gas flow from the exhaust passage into the combustion chamber, and the piston displaces upwardly while the intake valve is opened within a crank angle range corresponding to the intake stroke during the forward rotation of the crankshaft, to thereby generate a backward gas flow from the combustion chamber to the intake passage, and wherein the target amount of the reverse rotation is set to generate a backward gas flow from the exhaust passage through the combustion chamber to the intake passage in at least one cylinder.

17. A device according to claim 16, wherein the target amount of the reverse rotation is set to prevent the gas having flowed backwardly to the intake passage from being discharged from an air inlet of the intake passage.

18. A device according to claim 17, wherein the intake passage which lies between the intake valve and the air inlet of the intake passage has a first volume, the exhaust passage which lies between the exhaust valve and a catalyst arranged in the exhaust passage has a second volume, and the combustion chamber and the exhaust passage which lie between the intake valve and the catalyst has a third volume, and wherein the first volume is substantially equal to or larger than the second or third volume.

19. A device according to claim 16, wherein the engine further includes an air cleaner arranged in the intake passage, and wherein the air cleaner comprises a hydrocarbon storing agent for temporarily storing hydrocarbon therein.

20. A device according to claim 16, wherein the engine further includes a throttle valve arranged in the intake passage and a canister for temporarily storing hydrocarbon therein communicated with the intake passage between the throttle valve and the intake valve via a purge control valve, and wherein the throttle valve is closed and the purge control valve is opened when the crankshaft is rotated reversely, to introduce the gas having flowed backwardly into the intake passage to the canister.

21. A device according to claim 16, wherein the engine further includes a throttle valve arranged in the intake passage, and wherein an opening degree of the throttle valve is controlled to prevent pressure in the intake passage from exceeding a predetermined allowable value when the crankshaft is rotated reversely.

22. A device according to claim 16, wherein the engine further includes a fuel injector for injecting fuel into the intake passage or the combustion chamber, and a spark plug, and wherein a fuel injection by the fuel injector and/or an ignition by the spark plug is conducted when the crankshaft is rotated reversely.

23. A device according to claim 22, wherein it is determined whether the fuel injection and/or the ignition must be conducted when the crankshaft is rotated reversely, based on the warming-up condition of the engine.

24. A device according to claim 22, wherein, if the fuel injection must be conducted when the crankshaft is rotated reversely, the fuel injection is conducted when the intake valve or the exhaust valve is opened.

25. A device according to claim 16, further comprising means for controlling the rotational speed of the crankshaft in the reverse direction to prevent it from exceeding a predetermined allowable speed.

26. A device according to claim 25, further comprising an electric motor for rotating the crankshaft forwardly or reversely, wherein the electric motor is controlled to prevent the rotational speed of the crankshaft in the reverse direction from exceeding the allowable speed.

27. A device according to claim 25, wherein the engine further includes a fuel injector for injecting fuel into the intake passage or the combustion chamber, and a spark plug, wherein a fuel injection by the fuel injector and/or an ignition by the spark plug is conducted when the crankshaft is rotated reversely, and wherein the fuel injection and/or the ignition is controlled to prevent the rotational speed of the crankshaft in the reverse direction from exceeding the allowable speed.

28. A device according to claim 16, wherein the engine includes a plurality of cylinders having respective spark plugs, and wherein the ignition is conducted in a part of the cylinders and is prohibiting the ignition in the remaining cylinders when the crankshaft is rotated reversely.

29. A device according to claim 16, further comprising means for obtaining an engine temperature when the engine must be started, and wherein the target amount of the reverse rotation is set based on the obtained engine temperature.

30. A device according to claim 16, further comprising an exhaust throttle valve arranged in the exhaust passage, wherein the exhaust throttle valve is closed when the crankshaft is rotated reversely.

* * * * *